(12) United States Patent
Kojima et al.

(10) Patent No.: US 7,522,475 B2
(45) Date of Patent: Apr. 21, 2009

(54) ULTRASONIC SENSOR AND OBSTACLE DETECTION DEVICE

(75) Inventors: Kiyonari Kojima, Nishikamo-gun (JP); Toshihiro Hattori, Okazaki (JP); Mitsuyasu Matsuura, Chiryu (JP); Ayako Okamoto, Okazaki (JP); Mitsuru Fujita, Toyohashi (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/896,302

(22) Filed: Aug. 30, 2007

(65) Prior Publication Data

US 2008/0232197 A1   Sep. 25, 2008

(30) Foreign Application Priority Data

| Sep. 5, 2006 | (JP) | ............................. 2006-240732 |
| Apr. 2, 2007 | (JP) | ............................. 2007-096704 |
| Apr. 4, 2007 | (JP) | ............................. 2007-098751 |

(51) Int. Cl.
*G01S 7/521* (2006.01)
*H04R 17/00* (2006.01)
*G01S 15/42* (2006.01)

(52) U.S. Cl. .................. 367/188; 367/138; 367/99; 367/140

(58) Field of Classification Search .................. 367/138, 367/99, 140, 188
See application file for complete search history.

(56) References Cited

U.S. PATENT DOCUMENTS

2008/0232197 A1 *  9/2008  Kojima et al. .................. 367/99

FOREIGN PATENT DOCUMENTS

| JP | 63-243783 | 10/1988 |
| JP | 10-224880 | 8/1998 |
| JP | 2004-253911 | 9/2004 |
| JP | 2008089569 A * | 4/2008 |

* cited by examiner

*Primary Examiner*—Dan Pihulic
(74) *Attorney, Agent, or Firm*—Nixon & Vanderhye, PC

(57) ABSTRACT

An ultrasonic sensor includes: a first vibrator for transmitting an ultrasonic wave; multiple second vibrators for outputting a reception signal of a reflection wave; a casing having a bottom for accommodating the vibrators, an outer surface of the bottom providing a vibrating surface; and multiple tubes for guiding the ultrasonic wave. Each tube has a first opening coupled with an outside of a mobile body. An area of the first opening is smaller than an area of the vibrating surface. A distance between two adjacent first openings is smaller than a distance between two adjacent vibrating surfaces. The length of the tubes is determined to equalize a phase difference of the reflection waves at the first openings is equal to that at the vibrating surfaces.

21 Claims, 14 Drawing Sheets

ULTRASONIC SENSOR AND OBSTACLE DETECTION DEVICE

CROSS REFERENCE TO RELATED APPLICATIONS

This application is based on Japanese Patent Applications No. 2006-240732 filed on Sep. 5, 2006, No. 2007-96704 filed on Apr. 2, 2007, and No. 2007-98751 filed on Apr. 4, 2007, the disclosures of which are incorporated herein by reference.

FIELD OF THE INVENTION

The present invention relates to an ultrasonic sensor and an obstacle detection device.

BACKGROUND OF THE INVENTION

Conventionally, for example, as represented in JP-A-2004-253911, ultrasonic sensors equipped with a plurality of reception-purpose piezoelectric vibrating elements are known in the technical field.

The ultrasonic sensor indicated in JP-A-2004-253911 has been equipped with a plurality of piezoelectric vibrating elements and a single vibration case for storing thereinto these piezoelectric vibrating elements. These plural piezoelectric vibrating elements contain at least one transmission-purpose piezoelectric vibrating element and at least two reception-purpose piezoelectric vibrating elements. Then, a plurality of storage concave portions having bottom planes along an incoming/outgoing radiation plane have been provided in the vibration case, and the piezoelectric vibrating elements have been contacted/arranged on the bottom planes of the corresponding storage concave portions. Also, a partitioning concave portion has been formed on a portion of the vibration case, which is located between the storage concave portion where the transmission-purpose storage concave portion has been formed, and the storage concave portion where the reception-purpose storage concave portion has been formed.

On the other hand, as methods capable of detecting azimuth of an obstruction, generally speaking, it is known that such a detection method for detecting the obstruction based upon a phase difference of reception signals of the respective reception-purpose piezoelectric vibration elements can have higher detecting precision than another detection method for detecting the obstruction based upon a time difference of the reception signals of the respective reception-purpose piezoelectric vibrating elements. For example, assuming now that a frequency of an ultrasonic wave is 40 KHz (namely, wavelength λ being 8.5 mm), generally speaking, a dimension of a vibrating plane required for an ultrasonic sensor is selected to be approximately 10 mm, while considering a rigidness (namely, anti-shock characteristic with respect to jumping stone) of a vibrating plate (namely, portion of vibration case where piezoelectric vibrating elements have been contacted/arranged). The above-described vibrating plane implies such a plane which is vibrated by vibrations of the piezoelectric vibrating elements and/or of reflection waves. Also, it is preferable that adjacent vibrating planes have been separated from each other in an acoustic technical field. As a consequence, in the case of the above-described ultrasonic sensor disclosed in JP-A-2004-253911, a distance between the vibrating planes (distance between centers) corresponding to the adjacent reception-purpose piezoelectric vibrating elements becomes such a value exceeding 10 mm, and thus, exceeds the wavelength of the ultrasonic wave in a direction along the incoming/outgoing radiation plane. In other words, even when the azimuth of the obstruction is tried to be detected based upon the phase difference between the plural reception-purpose piezoelectric vibrating elements, the ultrasonic sensor cannot detect the obstruction over a wide range, but only over a narrow range. As to this wide range, for instance, such a range may be conceived which is defined by ±90 degrees (namely, 180 degrees while vibrating plane is set as center) along the horizontal direction with respect to a road plane. To the contrary, another technical idea may be conceived by which the vibrating plane is reduced, so that the wide range may be detected. However, in order to maintain frequencies, the thickness of the vibrating plate must be made thin, which may cause the rigidness of the vibrating plate to be lowered. As a result, it is practically difficult to secure the anti-shock characteristic.

Also, when the ultrasonic sensor disclosed in JP-A-2004-253911 is mounted on, for example, a bumper of a vehicle, at least the incoming/outgoing radiation plane of the vibration case is exposed via a through hole formed in the bumper to an exterior portion of the vehicle. This incoming/outgoing plane contains rear planes of bottom planes of the storage concave portions and the portions between the respective storage concave portions. In other words, the portion exposed to the exterior portion of the vehicle becomes large, which may deteriorate attractive looks.

Thus, it is required to provide an ultrasonic sensor and an obstruction detecting apparatus equipped with the ultrasonic sensor capable of detecting azimuth of an obstruction based upon a phase difference over a wide range without reducing an anti-shock characteristic, while attractive looks thereof are improved.

Further, conventionally, for example, as represented in JP-A-63-243783 and JP-A-10-224880, ultrasonic sensor apparatuses equipped with the following arrangements are known in the technical field. That is, the ultrasonic sensor apparatuses contain a plurality of waveguides; ultrasonic elements (ultrasonic wave transmitters, ultrasonic wave receivers and ultrasonic vibrating elements) are arranged at one end of each of these waveguides; and ultrasonic waves are transferred via the waveguides.

As previously described, in an ultrasonic sensor apparatus having such an arrangement that an ultrasonic element is arranged at one end of each of these waveguides, the other end of each of these waveguides on the arranging sides of the ultrasonic elements is opened. As a result, for example, when the conventional ultrasonic sensor apparatuses are mounted on moving objects such as vehicles, there are certain risks that foreign articles such as stones, water, sand, and mud are penetrated into the waveguides. Then, the following problems may be conceived: That is, since the foreign articles collide with the ultrasonic elements, these ultrasonic elements may be damaged, and also, the foreign articles located within the waveguides may give adverse influences to propagation of ultrasonic waves. However, reflection waves caused by reflection articles (e.g., obstructions) present outside the ultrasonic sensor apparatuses are changed based upon the below-mentioned aspects, namely, whether or not reflection articles are present; distances separated from the reflection articles; sorts (surface concaves/convexes etc.) of the reflection articles. For instance, there are some possibilities that any reflection wave cannot be detected not only when any reflection article is not present, but also even when a reflection article is present. As a consequence, even when reception signals caused by reflection waves are brought into such a condition which is different from the normal reception condition (for instance, such a reception condition that peak value is low), and/or even when reception signals caused by reflection waves are brought into such a condition that these reception signals cannot be detected, it is practically difficult to discriminate these causes from each other, namely, the abnormal condition which is caused by the reflection articles, or the non-detection condition caused by that the ultrasonic sensor apparatus itself is under abnormal condition.

Thus, it is required to provide an ultrasonic sensor apparatus capable of diagnosing whether or not the own ultrasonic sensor apparatus is brought into an abnormal condition.

SUMMARY OF THE INVENTION

In view of the above-described problem, it is an object of the present disclosure to provide an ultrasonic sensor and an obstacle detection device.

According to a first aspect of the present disclosure, an ultrasonic sensor includes: a first piezoelectric vibrator for transmitting an ultrasonic wave as a transmission wave toward an outside of a mobile body, wherein the transmission wave is reflected by an object of the outside of the mobile body so that a reflection wave is generated; a plurality of second piezoelectric vibrators for receiving the reflection wave and for outputting a reception signal corresponding to strength of the reflection wave; a casing for accommodating the first piezoelectric vibrator and the plurality of second piezoelectric vibrators, wherein the casing includes a bottom, wherein each of the first piezoelectric vibrator and the plurality of second piezoelectric vibrators contacts and is fixed to an inner surface of the bottom of the casing, and wherein an outer surface of the bottom of the casing opposite to the inner surface provides a vibrating surface; and a plurality of waveguide tubes for guiding the ultrasonic wave between the outside of the mobile body and the vibrating surface of the casing. Each waveguide tube has a first opening, which is coupled with a through hole of an outer member of the mobile body so that the waveguide tube communicates with the outside of the mobile body. Each waveguide tube corresponds to one of the first piezoelectric vibrator and the plurality of second piezoelectric vibrators. An area of the first opening of each waveguide tube is smaller than an area of the vibrating surface of the casing. A distance between two adjacent first openings of waveguide tubes is smaller than a distance between two adjacent vibrating surfaces. Each waveguide tube has a length, which is set in such a manner that a phase difference of the reflection waves at the first openings between one waveguide tube and another waveguide tube is equal to a phase difference of the reflection waves at the vibrating surfaces between the one waveguide tube and the another waveguide tube.

In the above sensor, appearance of the sensor, i.e., design of the sensor, is improved since the area of the first opening of each waveguide tube is smaller than the area of the vibrating surface of the casing. Further, since the length of each waveguide tube is appropriately determined, so that the direction of the object is detectable. Further, since the distance between two adjacent first openings of waveguide tubes is smaller than the distance between two adjacent vibrating surfaces, detection area of the object is improved. Furthermore, since the first ends of the waveguide tubes provide a transmission and reception surface of the ultrasonic wave, the sensor can detect the object without reducing impact strength.

According to a second aspect of the present disclosure, an obstacle detection device including the ultrasonic sensor defined in the first aspect of the present disclosure. The obstacle detection device detects a direction of the object as an obstacle based on a phase difference of reception signals between two of the plurality of second piezoelectric vibrators. This device can detect the obstacle with wide range.

According to a third aspect of the present disclosure, an ultrasonic sensor includes: a plurality of waveguide tubes having a first end and a second end; at least one transmission ultrasonic element for transmitting an ultrasonic wave as a transmission wave through one of the plurality of waveguide tubes, wherein the one transmission ultrasonic element is disposed on the first end of the one of the plurality of waveguide tubes; at least one reception ultrasonic element for receiving the ultrasonic wave and for outputting a reception signal corresponding to strength of the ultrasonic wave, wherein the one reception ultrasonic element is disposed on the first end of another one of the plurality of waveguide tubes; and a determination element for determining malfunction of the one transmission ultrasonic element, the one reception ultrasonic element, the one of the plurality of waveguide tubes, or the another one of the plurality of waveguide tubes. The determination element determines the malfunction on the basis of the reception signal of the ultrasonic wave, which is transmitted from the second end of the one of the plurality of waveguide tubes, and directly introduced into the second end of the another one of the plurality of waveguide tubes. The above sensor can diagnose the malfunction of the sensor based on the reception signal of a detour wave.

According to a fourth aspect of the present disclosure, an ultrasonic sensor includes: a waveguide tube having a first end and a second end; at least one transmission ultrasonic element for transmitting an ultrasonic wave through the waveguide tube, wherein the transmission ultrasonic element is disposed on the first end of the waveguide tube; at least one reception ultrasonic element for receiving the ultrasonic wave and for outputting a reception signal corresponding to strength of the ultrasonic wave, wherein the one reception ultrasonic element is disposed on the first end of the waveguide tube; and a determination element for determining malfunction of the waveguide tube on the basis of an attenuation waveform of the transmission wave from the transmission ultrasonic element. The above sensor can diagnose the malfunction of the sensor based on the attenuation waveform of the transmission wave.

According to a fifth aspect of the present disclosure, an ultrasonic sensor for detecting an object of an outside of a vehicle includes: a transmission piezoelectric vibrator for transmitting an ultrasonic wave as a transmission wave toward the outside of a vehicle, wherein the transmission wave is reflected by the object of the outside of the vehicle so that a reflection wave is generated; a reception piezoelectric vibrator for receiving the reflection wave and for outputting a reception signal corresponding to strength of the reflection wave; a plurality of casings for accommodating one of the transmission piezoelectric vibrator and the reception piezoelectric vibrator, wherein each casing includes a bottom, wherein each of the transmission piezoelectric vibrator and the reception piezoelectric vibrator contacts an inner surface of the bottom of the casing, and wherein an outer surface of the bottom of each casing opposite to the inner surface provides a vibrating surface; and a plurality of waveguide tubes for guiding the ultrasonic wave between the outside of the mobile body and the vibrating surface of the casing. Each waveguide tube has a first opening, which is coupled with a through hole of an outer member of the mobile body so that the waveguide tube communicates with the outside of the mobile body. Each waveguide tube corresponds to one of the transmission piezoelectric vibrator and the reception piezoelectric vibrator. An area of the first opening of each waveguide tube is smaller than an area of the vibrating surface of the casing. A distance between two first openings of adjacent two waveguide tubes is smaller than a distance between two vibrating surfaces of the adjacent two waveguide tubes. The length of one waveguide tube is defined as L. The ultrasonic wave has a wavelength defined as λ. The length of another waveguide tube is defined as L+nλ, and n represents an integer. In the above sensor, appearance of the sensor, i.e., design of the sensor, is improved since the area of the first opening of each waveguide tube is smaller than the area of the vibrating surface of the casing. Further, since the length of each waveguide tube is appropriately determined, so that the direction of the object is detectable. Further, since the distance between two adjacent first openings of waveguide tubes is smaller than the distance between two adjacent vibrating surfaces, detection area of the object is improved. Furthermore, since the first ends of the waveguide tubes provide a transmission and reception surface of the ultrasonic wave, the sensor can detect the object without reducing impact strength.

BRIEF DESCRIPTION OF THE DRAWINGS

The above and other objects, features and advantages of the present invention will become more apparent from the following detailed description made with reference to the accompanying drawings. In the drawings:

FIG. 1A is a plan view of the ultrasonic sensor, and FIG. 1B is a sectional view of the ultrasonic sensor, taken along a line IB-IB of FIG. 1A;

FIG. 3A is a plan view of the ultrasonic sensor, and FIG. 3B is a sectional view of the ultrasonic sensor, taken along a line IIIB-IIIB of FIG. 3A;

FIG. 4A is a plan view of the ultrasonic sensor, and FIG. 4B is a sectional view of the ultrasonic sensor, taken along a line IVB-IVB of FIG. 4A.

FIG. 5A is a plan view of the ultrasonic sensor, and FIG. 5B is a sectional view of the ultrasonic sensor, taken along a line VB-VB of FIG. 5A;

FIG. 7A is a plan view of the ultrasonic sensor, and FIG. 7B is a sectional view of the ultrasonic sensor, taken along a line VIIB-VIIB of FIG. 7A;

FIG. 18A indicates such a status that an abnormal event is not present and an obstruction is present; FIG. 18B shows such a status that an abnormal event is not present and an obstruction is not present; FIG. 18C indicates such a status that an abnormal event is present and an obstruction is present;

FIG. 22A shows such a case that an abnormal event occurs on a reception side; and FIG. 22B indicates such a case that an abnormal event occurs on a transmission side.

DETAILED DESCRIPTION OF THE PREFERRED EMBODIMENTS

First Embodiment

Figure 1A:
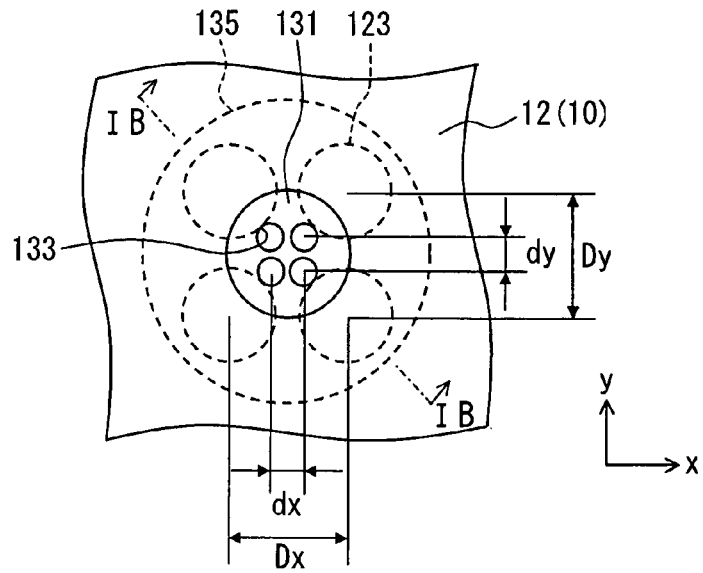
FIG. 1A and FIG. 1B are diagrams for schematically showing a structure of an ultrasonic sensor according to a first embodiment.
Figure 1B:
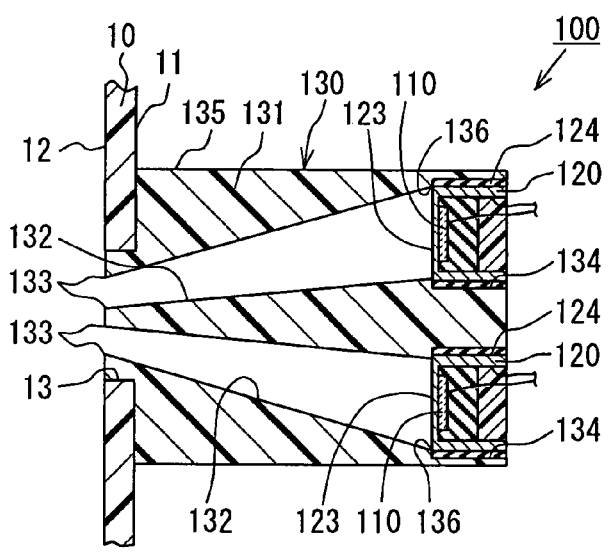
Figure 2:
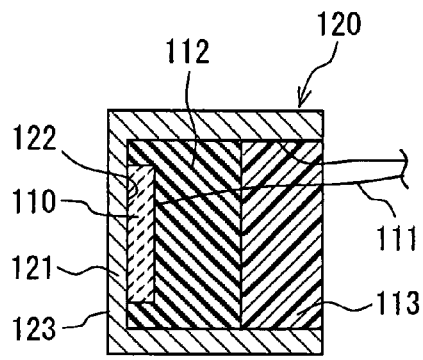
FIG. 2 is a sectional view for representing an enlarged peripheral portion of a housing shown in FIG. 1B.

FIG. 1A and FIG. 1B are diagrams for schematically showing a structure of an ultrasonic sensor according to a first embodiment: FIG. 1A is a plan view of the ultrasonic sensor; and FIG. 1B is a sectional view of the ultrasonic sensor, taken along a line IB-IB of FIG. 1A. FIG. 2 is a sectional view for representing an enlarged peripheral portion of a housing shown in FIG. 1B. It should be understood that FIG. 1A and FIG. 1B represent such a condition that the ultrasonic sensor has been mounted on a mounting portion of a moving object, and FIG. 1A is a plan view of the ultrasonic sensor, as viewed from an exterior portion of the moving object.

In the first embodiment, a description is made of an example in which the ultrasonic sensor and an obstruction detecting apparatus containing this ultrasonic sensor are employed in a vehicle functioning as the moving object. Concretely speaking, as shown in FIG. 1A and FIG. 1B, an ultrasonic sensor 100 has been mounted on, for example, a forward bumper, a backward bumper, or bumpers on the side of 4 corners of the vehicle in order that an obstruction present around the vehicle can be detected. Otherwise, the ultrasonic sensor 100 has been mounted on a body of the vehicle (on bumper 10 in FIG. 1A and FIG. 1B).

As shown in FIG. 1A and FIG. 1B, the ultrasonic sensor 100 has been arranged by, as a major structural element, a plurality of piezoelectric vibrating elements 110, a housing 120, and a waveguide 130. The housing 120 stores thereinto the piezoelectric vibrating elements 110 and the like. The waveguide 130 guides ultrasonic waves between the piezoelectric vibrating elements 110 and an exterior portion of a vehicle.

The piezoelectric vibrating elements 110 have been formed in, for example, a disk shape. While piezoelectric ceramics such as barium titanate and PZT are manufactured as a sintered body, a voltage is applied to this sintered body so as to generate vibrations from the piezoelectric vibrating elements 110. In the first embodiment, 4 pieces of piezoelectric vibrating elements 110 have been contained in such a manner that two pieces of the piezoelectric vibrating elements 110 are arranged along a horizontal direction (namely, "x" direction shown in FIG. 1A) with respect to a road plane, and also, 2 pieces of the piezoelectric vibrating elements 110 are arranged along a vertical direction (namely, "y" direction shown in FIG. 1A) with respect to the road plane as a single ultrasonic sensor 100. Also, each of these 4 piezoelectric vibrating elements 110 has been arranged to commonly function as a transmission-purpose vibrating element and a reception-purpose vibrating element. The transmission-purpose vibrating element transmit ultrasonic waves as a transmission wave to an exterior portion of the vehicle. The reception-purpose vibrating element receives reflection waves (ultrasonic echoes) of an obstruction located in the exterior portion of the vehicle, and then, outputs a reception signal in response to strengths of the reflection waves. As previously described, if at least one element of the plurality of piezoelectric vibrating elements 110 has a construction which commonly contains a transmission function and a reception function, then a total number of these piezoelectric vibrating elements 110 can be reduced and cost thereof can be reduced. Also, a three-dimensional size of the ultrasonic sensor 100 can be made compact.

Also, in this first embodiment, the ultrasonic sensor 100 has been arranged in such a manner that ultrasonic waves are transmitted at the same time from the plurality of piezoelectric vibrating elements 110. As previously explained, while 2 pieces, or more pieces of the transmission-purpose piezoelectric vibrating elements 110 are contained, when the ultrasonic sensor 100 is arranged by that the ultrasonic waves are simultaneously transmitted from the plural piezoelectric vibrating elements 110, higher sound pressure may be gained, as compared with sound pressure gained from such a sensor arrangement that one piece of the transmission-purpose piezoelectric vibrating element 110 is contained. In other words, directivity may be narrowed and a detection distance may be prolonged.

While electrodes (not shown) have been formed on the surface of the piezoelectric vibrating elements 110, leads 111 have been electrically connected to the electrodes. In the first embodiment, as indicated in FIG. 2, one of the leads 111 has been connected to an inner plane of the housing 120 electrically connected to the electrodes. Then, the leads 111 have been electrically connected to a circuit board (not shown) on which a processing circuit has been formed. The processing circuit outputs a drive signal which is used to vibrate the piezoelectric vibrating elements 110 in order to generate ultrasonic waves, and inputs such voltage signals produced due to the piezoelectric effect in such a case that ultrasonic waves are propagated to the piezoelectric vibrating elements 110, so that distortions are produced in the piezoelectric vibrating elements 110. In other words, while the ultrasonic sensor 100 has been arranged as a portion of an obstruction detecting apparatus containing this ultrasonic sensor 100, the obstruction detecting apparatus can calculate a distance measured up to an obstruction present around the vehicle based upon times measured from the transmissions of the ultrasonic waves until the receptions of the ultrasonic waves and/or echoes thereof, and further can calculate azimuth of the obstruction based upon a phase difference among reception signals derived from the plurality of piezoelectric vibrating elements 110.

For accommodating each one piezoelectric vibrating element 110, the housing 120 has been provided in a cylindrical shape having a bottom, while aluminum, or a synthetic resin, for example (note that aluminum is used in first embodiment) is employed as a structural material. Then, as represented in FIG. 2, a piezoelectric vibrating element 110 has been installed (for example, fixed) on an inner plane 122 of a bottom portion 121. In other words, the arranged bottom portion 121 of the piezoelectric vibrating element 110 plays a role as a vibrating plate, and an outer plane 123 (namely, rear plane of inner plane 122) of the bottom portion 121 constitutes a vibrating plane. It should also be noted that in the first embodiment, as indicated by a broken line shown in FIG. 1A, the outer plane 123 functioning as the vibrating plane has been made in a circular shape in the plane direction (namely, direction along road plane) of a bumper 10.

Also, as shown in FIG. 2, a sound absorbing member 112 has been arranged at a peripheral portion of the piezoelectric vibrating element 110 except for such a place which is faced to the inner plane 122. This sound absorbing member 112 is employed so as to absorb ultrasonic waves which are radiated within the housing 120, since the piezoelectric vibrating element 110 is stretched/compressed, so that the bottom portion 121 of the housing 120 is vibrated. The sound absorbing member 112 is made of a material, for example, a silicon sponge having superior sound absorbing performance. Then, while a sealing member 113 has been provided on the sound absorbing member 112, an interior portion of the housing 120 has been air-tightly sealed by this sealing member 113.

The waveguide unit 130 has been arranged in order to conduct ultrasonic waves between an exterior portion of the vehicle and the piezoelectric vibrating element 110 (namely, outer plane 123 as vibrating plane) arranged in an interior portion (inner plane 11 side of bumper 10) of the vehicle. The waveguide 130 according to the first embodiment has been made by forming a plurality of tube portions 132 with respect to the same base member 131. This tube portion 132 corresponds to a waveguide. As shown in FIG. 1B, one opening edge 133 of the tube portion 132 has been opened in one plane of the base member 131, and has been exposed from the exterior portion of the vehicle via the through hole 13 of the bumper 10 under such a condition that the tube portion 132 is mounted on the bumper 10. Also, the other opening edge 136 has been coupled to a fixing-purpose groove 134 formed in an opposite plane of the base member 131, which is located opposite to the plane thereof for forming the opening edge 133. This fixing-purpose groove 134 is such a groove on which the housing 120 containing the piezoelectric vibrating element 110 is fixed. Under such a condition that the housing 120 has been fixed in the fixing-purpose groove 134, the opening edge 136 of the tube portion 132 has been brought into such a condition that this opening edge 136 is arranged on the side of the opening edge 133 while a small gap is defined between the outer plane 123 and the own opening edge 136. As previously explained, in the tube portion 132, the opening edge 133 constitutes an opening edge on the side of a mounting portion, whereas the opening edge 136 constitutes an opening edge on the side of a vibrating plane.

As the structural material of the waveguide 130 (base member 131), any materials may be employed if these materials have large differences in acoustic impedances with respect to a medium (air) of the vehicle exterior portion and a medium (air) within the tube portion 132 (for example, acoustic impedance difference is larger than, or equal to $1\times10^2$), and also, if ultrasonic waves can be reflected in a higher efficiency on the wall plane of the base member 131 which constitutes the tube portion 132. It is preferable to employ such a material different from the material of the housing 120 in the acoustic technical field. Concretely speaking, a metal material, a resin material, rubber, and the like may be employed. As indicated in this first embodiment, with respect to such a structure that the plurality of waveguides (tube portions 132) are constructed in an integral body, if the resin material is selected, then these waveguides may be easily manufactured.

As shown in FIG. 1A, with respect to the plurality of tube portions 132 (namely, waveguides), opening areas of the respective opening edges 133 have been set to become smaller than areas of the corresponding outer planes 123 functioning as the vibrating planes. In the first embodiment, while the above-described condition can be satisfied, all of the opening edges 133 have been made in circular shapes whose shapes and dimensions are equal to each other, and further, a plurality of the corresponding outer planes 123 have been set to become equal shapes and equal dimensions. Also, in all of the tube portions 132, opening areas of the opening edges 136 on the side of the vibrating plates are made substantially equal to the vibrating planes (outer planes 123); and opening areas of the opening edges 133 on the side of the bumper 10 are made smaller than the opening areas of the opening edges 136. Then, in all of the tube portions 132, sectional shapes between the opening edges 133 on the side of the bumper 10 and the opening edge 136 on the side of the vibrating planes (outer planes 123) are formed in the circular shapes, and also, areas (tube diameters) of these circular sectional planes are increased from the open edges 133 toward the opening edges 136 (vibrating planes).

Also, as indicated in FIG. 1A, an opening interval "d (dx, dy)" between the adjoining opening edges 133 has been set to be narrower than a corresponding interval "D (Dx, Dy)" between the adjoining outer planes 123. In the first embodiment, while the above-described condition is satisfied, the opening interval d (dx, dy) along a horizontal direction ("x" direction shown in FIG. 1A) with respect to the road plane has been set to be equal to the opening interval d (dx, dy) along a vertical direction ("y" direction shown in FIG. 1A) with respect to the road plane. Also, the opening interval "d" has been set to be shorter than, or equal to a half-wave length with respect to a wavelength of an ultrasonic wave (in this first embodiment, opening interval "d" has be set to half-wave length).

Moreover, lengths of the respective tube portions 132 have been set in such a manner that reflection waves caused by an obstruction are transferred to the outer planes 123 functioning as the vibrating planes while mutual phase differences on the bumper 10 (namely, transmission/reception planes of ultrasonic waves) are maintained. It should also be noted that the lengths of the respective tube portions 132 correspond to distances from the opening edges 133 up to the outer planes 123. In order that the reflection waves are transferred while maintaining the mutual phase differences, assuming now that a length of a single pipe portion 132 is defined as "L", lengths of other tube portions 132 may be merely set to be equal to "L", or such lengths shifted by "L+nλ" (symbol "n" being positive integer, and symbol "λ" being wavelength of ultrasonic wave). In this first embodiment, all of these plural tube portions 132 has been set to be equal to each other.

The waveguide 130 constructed in the above-described manner has been fixed on the bumper 10 under such a condition that the housings 120 containing the piezoelectric vibrating elements 110 are fixed in the fixing-purpose grooves 134. In the first embodiment, a portion of the base member 131 containing the opening portions 133 has been inserted into the through hole 13 of the bumper 10, whereas another portion of the base member 131 which is located opposite to the inner plane 11 of the bumper 10 has been adhered and fixed with respect to the inner plane 11. Then, under this fixed condition, both the opening edges 133 (one face of the base member 131) are made in a co-planer condition with respect to the outer plane 12 of the bumper 10. It should also be understood that the housings 120 containing the piezoelectric vibrating elements 110 have been fixed via vibration absorbing members 124 in the corresponding fixed-purpose grooves 134 in such a manner that the outer planes 123 functioning as the vibrating planes are located on the side of the opening edges 133. In other words, the bottom portions 121 functioning as the vibrating plates are not directly contacted to the base member 131 (opening edges 136 of tube portions 132) which constitutes the waveguide 130, but also, the base member 131 does not suppress vibrations of the bottom portions 121. The vibration absorbing members 124 have been employed in order to reduce unnecessary vibrations which are transferred between the housings 120 (bottom portions 121) and the waveguide 130 (base member 131), and have been constructed of, for example, silicone rubber polyurethane, and the likes. It should also be noted that reference numeral 135 indicated in FIG. 1A and FIG. 1B shows an outer plane of the base member 131.

As previously described, in accordance with the ultrasonic sensor 100 and the obstruction detecting apparatus equipped with the ultrasonic sensor 100, which are related to the first embodiment, while the vibrating planes (outer planes 123) of the housings 120 are not used as the transmitted/reception planes on the bumper 10 of the vehicle, the plural pieces of the tube portions 132 (waveguides) which conduct the ultrasonic waves between the bumper 10 and the outer planes 123 (piezoelectric vibrating elements 110) are provided in correspondence with the piezoelectric vibrating elements 110, so that the opening planes of the opening edges 133 of the tube portions 132 are employed as the transmission/reception planes. Also, the opening areas of the opening edges 133 of the tube portions 132 are made smaller than the vibrating planes (outer planes 123), and the opening interval "d (dx, dy)" of the adjacent opening edges 133 is made narrower than the interval "D (Dx, Dy)" of the adjacent vibrating planes (outer planes 123). As a consequence, the exposed portion of the ultrasonic sensor 100 which is exposed from the bumper 10 of the vehicle to the exterior portion of the vehicle can be made smaller than that of the conventional ultrasonic sensor, so that the attractive looks thereof can be improved. In particular, the opening areas of the opening edges 133 on the side of the bumper 10 are made smaller than the opening areas of the opening edges 136 in the first embodiment. As a result, the attractive looks can be furthermore improved.

Also, the respective lengths of the tube portions 132 have been set to such lengths by which the reflection waves may be transferred to the vibrating planes (outer planes 123) while the phase differences of these reflection waves on the bumper 10 are maintained. As a result, the azimuth can be detected based upon the phase differences. More specifically, in the first embodiment, since all of the lengths of these plural tube portions 132 are made equal to each other, the three-dimensional size of the sensors can be made compact. In addition, the opening interval "d" of the adjacent opening edges 133 is made narrower than the interval "D" of the adjacent vibrating planes (output planes 123). As a result, the azimuth can be detected based upon the phase difference within the wider range than that of the conventional ultrasonic sensor. In particular, the opening interval "d" of the adjacent opening edges 133 is selected to be shorter than, or equal to the half-wave length with respect to the wavelength of the ultrasonic wave. As a result, it is possible to detect the azimuth of the obstruction over the wide range larger than, or equal to ±90 degrees with respect to the center axis of the vibrating planes (outer planes 123). If the ultrasonic sensor 100 has such an arrangement, then the substantially entire area of the plural piezoelectric vibrating elements 110 (reception-purpose piezoelectric vibrating elements) along the arranging direction can be constructed as the area capable of detecting the azimuth in such a case that the mounting portion where the ultrasonic sensor 100 is fixed constitutes such a plane like the bumper 10. Also, the side lobes are cancelled by each other, so that it is possible to reduce and/or avoid the erroneous detection as to the azimuth of the obstruction. As previously described, since the waveguides 130 are employed, the opening planes of the opening edges 133 are constituted as the transmissions/reception planes. As a result, while the rigidness of the housing 120 is not lowered (namely, without lowering anti-shocking characteristic with respect to jumping stone etc.), the azimuth can be detected based upon the phase difference over the wide range.

Also, since the opening planes of the opening edges 133 of the tube portions 132 are constructed as the transmission/reception planes, it is possible to reduce the collision of the foreign article with the vibrating planes (outer planes 123) of the housings 120. In other words, it is possible to reduce such a risk that since the foreign article (especially, jumping stone) collides with the housings 120, the bottom portions 121 of the housings 120 and the piezoelectric vibrating elements 110 are broken (namely, anti-shocking characteristic as ultrasonic sensor 100 can be improved).

Also, the first embodiment has exemplified such an example that while the ultrasonic sensor 100 is equipped with the plurality of piezoelectric vibrating elements 110 having the transmission function, the ultrasonic waves are simultaneously transmitted from the plural transmission-purpose piezoelectric vibrating elements 110. In accordance with this structure, the sound pressure can be improved, as compared with that of such an ultrasonic sensor having one transmission-purpose piezoelectric vibrating element 110. As a result, the directivity can be narrowed, and the detection distance can be increased.

Also, such an example has been exemplified that each of the piezoelectric vibrating elements 110 commonly has the transmission function and the reception function. However, the ultrasonic sensor may be alternatively equipped with the piezoelectric vibrating elements 110 having either only the transmission function or only the reception function. The waveguides 130 may be alternatively arranged in correspondence with at least the reception-purpose piezoelectric vibrating elements 110. As indicated in this first embodiment, if the waveguides 130 are arranged also with respect to the transmission-purpose piezoelectric vibrating elements 110 (in first embodiment, piezoelectric vibrating elements having both transmission/reception functions), then the directivity of the transmission waves may also be controlled based upon the shapes and the dimensions of the opening edges 133. Moreover, while the plural pieces of transmission-purpose piezoelectric vibrating elements 110 are provided, if the opening interval "d" of the opening edges 133 is set to be shorter than, or equal to the half-wave length with respect to the wavelength of the ultrasonic wave, then the side lobes can be cancelled to each other, so that the directivity can be further made narrower.

Also, in the first embodiment, in the respective tube portions 132, the opening shapes and the opening dimensions of the opening portions 133 are made equal to each other. As a consequence, the side lobes can be clearly cancelled with each other, so that the synthesized directivity can be easily controlled.

Also, this first embodiment has exemplified such an example that the housings 120 having the piezoelectric vibrating elements 110 are fixed via the vibration absorbing member 124 on the base member 131 of the waveguide 130. However, in such a case that the base member 131 is made of a material (for example, rubber) capable of hardly transferring the unwanted vibrations, the above-described vibration absorbing member 124 may be alternatively omitted.

Also, the first embodiment has exemplified such an example that the opening areas of the opening edges 136 on the side of the vibrating planes are made substantially equal to the vibrating planes (outer planes 123). However, the opening areas of the opening edges 136 on the side of the vibrating planes may be made smaller than the vibrating planes (outer planes 123). In this alternative case, such a small gap may be formed between the outer planes 123 and the opening edges 136, while the small gap may not suppress the vibrations of the bottom planes 121 functioning as the vibrating plates, and furthermore, the ultrasonic waves may not be leaked form this small gap.

Also, the first embodiment has exemplified such an example that the base member 131 (opening edges 136 of tube portions 132) is not contacted to the outer plane 123 functioning as the vibrating plane. However, while the base member 131 (opening edges 136 of tube portions 132) may be alternatively contacted to a portion of the outer plane 123, such a portion within the outer plane 123 other than portions whose vibrations are constrained by the base member 131 may be constructed as a vibrating plane.

Further, the first embodiment has exemplified such an example that the sectional shapes of the tube portions 132 are made in the circular shapes. However, the sectional shapes of the tube portions 132 are not limited only to the above-described example. For example, the sectional shapes may be made in a rectangular shape and any polygonal shapes except for this rectangular shape. However, the closer the sectional shapes of the tube portions 132 are approximated to circular shapes, the lower the interference caused the ultrasonic waves can be reduced. As a consequence, as represented in this first embodiment, the sectional shapes of the tube portions 132 may be preferably made in the circular sectional shapes.

Second Embodiment

Figure 3A:
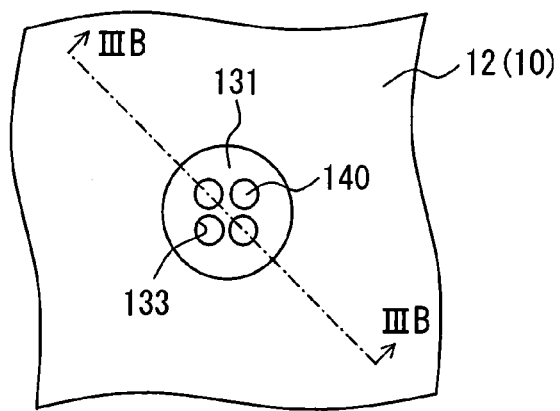
FIG. 3A and FIG. 3B are diagrams for schematically showing a structure of an ultrasonic sensor according to a second embodiment.
Figure 3B:
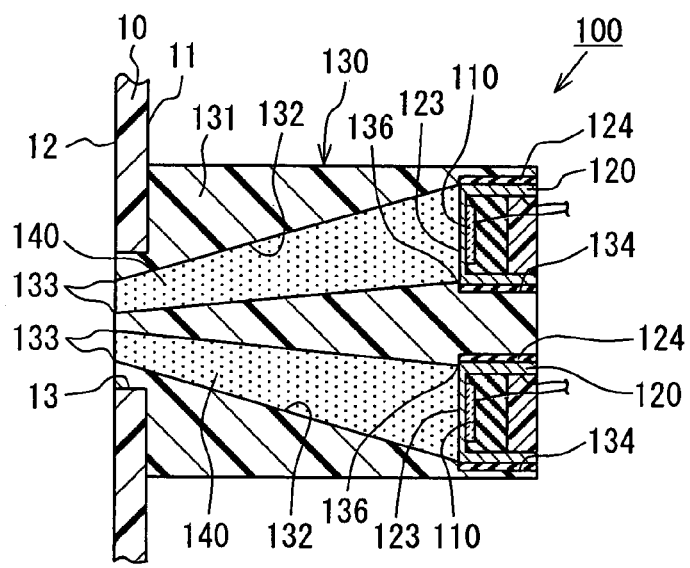

FIG. 3A and FIG. 3B are diagrams for schematically showing a structure of an ultrasonic sensor 100 according to the second embodiment: FIG. 3A is a plan view of the ultrasonic sensor 100; and FIG. 3B is a sectional view of the ultrasonic sensor 100, taken along a line IIIB-IIIB of FIG. 3A. It should be understood that FIG. 3A and FIG. 3B correspond to FIG. 1A and FIG. 1B respectively.

Since the ultrasonic sensor 100 and an obstruction detecting apparatus containing this ultrasonic sensor 100, according to the second embodiment, have many common technical ideas with respect to the ultrasonic sensor 100 and the obstruction detecting apparatus containing the ultrasonic sensor 100, which are shown in the first embodiment, a detailed description as to these common technical ideas is omitted, and different technical ideas will be mainly described in the below-mentioned specification.

In the first embodiment, the below-mentioned example has been disclosed: That is, the same medium (air) as that of the exterior portion of the vehicle is arranged in each of the tube portions 132 of the waveguides 130. In contrast to the first embodiment, in this second embodiment, as shown in FIG. 3A and FIG. 3B, the ultrasonic sensor 100 is featured by that interior portions of the tube portions 132 have been filled with an acoustic matching member 140. The acoustic matching member 140 has such an acoustic impedance between an acoustic impedance of a medium (air) of a vehicle exterior portion, and an acoustic impedance of a bottom portion 121 (aluminum as one example) of a housing 120. It should be understood that an acoustic impedance ($Kg/m^2s$) is a value specific to a medium, and is determined by "$\rho c$" (symbol "$\rho$" being density, and symbol "c" being sound velocity). An acoustic impedance of air corresponds to $4.1 \times 10^2$ (15° C.), and an acoustic impedance of aluminum corresponds to $1.4 \times 10^7$.

An ultrasonic wave has such a characteristic that between members having different acoustic impedances, the larger a difference in these acoustic impedances becomes, the larger reflection amounts are increased. As previously described, an acoustic impedance of an acoustic matching member 140 constitutes such an acoustic impedance between an acoustic impedance as to an atmosphere of a vehicle exterior portion, and an acoustic impedance so as to a bottom portion 121 of a housing 120. As a consequence, in accordance with the ultrasonic sensor 100 and the obstruction detecting apparatus containing the ultrasonic sensor 100 which are related to the second embodiment, a reflection amount of ultrasonic waves occurred between the vehicle exterior portion and the acoustic matching members 140 can be reduced, and in addition, a reflection amount of ultrasonic waves occurred between the acoustic matching members 140 and the bottom portions 121 of the housings 120 can be reduced. Moreover, as a consequence, transfer amounts of ultrasonic waves between the vehicle exterior portion and the bottom portions 121 (piezoelectric vibrating elements 110) of the housings 120 can be increased, as compared with those of such a sensor structure that the acoustic matching members 140 are not arranged.

As represented in FIG. 3A and FIG. 3B, the acoustic matching members 140 have been arranged within the respective tube portions 132 without any gap in such a manner that the opening portions 133 are blocked by the acoustic matching members 140. As a result, it is possible to avoid that foreign articles such as jumping stone, water, wax when the vehicle is washed are penetrated into the tube portions 132. In other words, it is possible to avoid that detecting precision is lowered which is caused by the above-described foreign articles. Also, it is possible to firmly avoid that the foreign articles (especially, jumping stone) collide with the vibrating planes (namely, outer planes 123) of the housing 120. As a result, it is possible to avoid that the bottom portions 121 of the housing 120 and the piezoelectric vibrating elements 110 are broken (namely, anti-shock characteristic as ultrasonic sensor 100 can be improved). It should also be understood that in this second embodiment, such portions of the acoustic matching members 140 which are exposed to the exterior portion via the through hole 13 of the bumper 10 are made in a co-plane with respect to the opening planes of the opening edges 133. As a consequence, the ultrasonic sensor 100 may have a preferably attractive look.

It should also be understood that if any members can satisfy the above-described conditions as the acoustic matching members 140, then any members may be alternatively employed. Preferably, among the materials (aluminum) for constructing the bottom portions 121 of the housings 120 and the medium (air) of the vehicle exterior portion, it is preferable to employ such a member having an acoustic impedance approximated to that of the medium of the vehicle exterior portion. As such an acoustic matching member 140, members whose density has been decreased may be employed, for example, acoustic matching members may be arranged in porous shapes, or by containing a large number of beads (including air). If such an acoustic matching member 140 is employed, then the reflection amount of the ultrasonic waves occurred between the medium (air) of the vehicle exterior portion and the acoustic matching member 140 can be reduced as compared to the case where a material having a density close to that of the material constituting the bottom portion 121 of the housing 120. Also, the outer planes 123 functioning as the vibrating planes can be easily vibrated by receiving the vibrations of the piezoelectric vibrating elements 110 and/or the reflection waves.

Third Embodiment

Figure 4A:
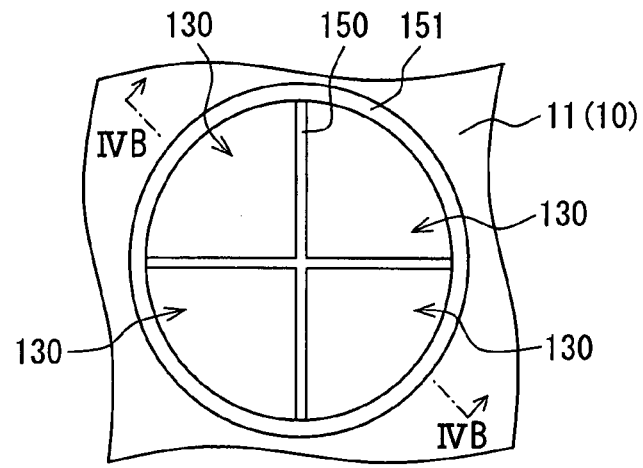
FIG. 4A and FIG. 4B are diagrams for schematically showing a structure of an ultrasonic sensor according to a third embodiment.
Figure 4B:
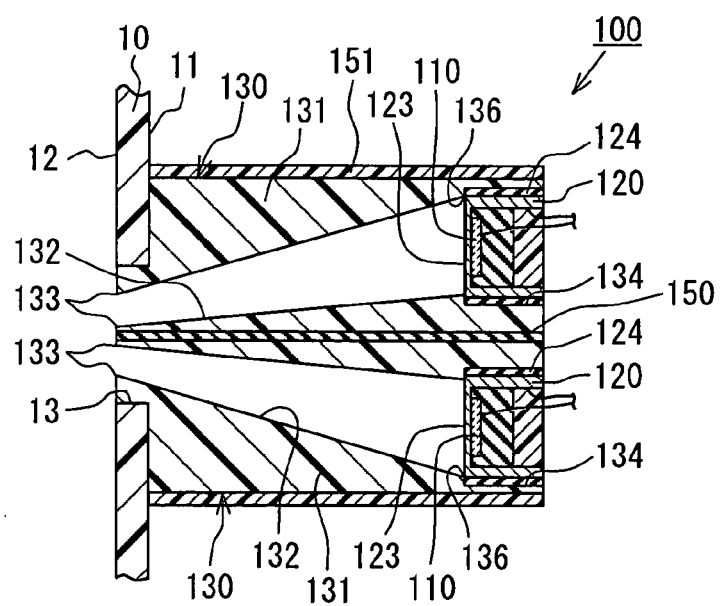

FIG. 4A and FIG. 4B are diagrams for schematically showing a structure of an ultrasonic sensor 100 according to the third embodiment: FIG. 4A is a plan view of the ultrasonic sensor 100; and FIG. 4B is a sectional view of the ultrasonic sensor 100, taken along a line IVB-IVB of FIG. 4A. It should be understood that FIG. 4A and FIG. 4B correspond to FIG. 1A and FIG. 1B respectively.

Since the ultrasonic sensor 100 and an obstruction detecting apparatus containing this ultrasonic sensor 100, according to the third embodiment, have many common technical ideas with respect to the ultrasonic sensor 100 and the obstruction detecting apparatus containing the ultrasonic sensor 100, which are shown in the first embodiment, a detailed description as to these common technical ideas is omitted, and different technical ideas will be mainly described in the below-mentioned specification.

In the first embodiment, the below-mentioned example has been disclosed: That is, while the plurality of tube portions 132 are provided with respect to one base member 131, these plural tube portions 132 are manufactured in the integral body as one waveguide 130. In contrast to the first embodiment, in this third embodiment, as shown in FIG. 4A and FIG. 4B, the ultrasonic sensor 100 is featured by that the tube portions 132 have been separated into plural tube portions in correspondence with the piezoelectric vibrating elements 110, and a single waveguide 130 (base member 131) is equipped with a single tube portion 132. More concretely speaking, while the base member 131 indicated in the first embodiment has been divided in a direction along the horizontal direction and in another direction along the vertical direction with respect to the road plane, the ultrasonic sensor 100 has contained 4 pieces of the wave guides 130 (base members 131) each equipped with one tube portion 132. Then, under such a condition that an unwanted vibration reducing member 150 having an acoustic impedance different from the acoustic impedance of the base member 131 has been arranged among the respective divided planes, the waveguides 130 have been stored within the same case so as to be held therein. The unwanted vibration reducing members 150 are employed so as to reduce unwanted vibrations which are transferred among the waveguides 130 (base members 131). Similar to the above-described vibration absorbing materials 124, these unwanted vibration reducing members 150 have been constructed by employing, for example, silicone rubber and polyurethane. It should also be noted that under such a condition that the respective waveguides 130 have been held in a case 151, structures other than the above-described structure are identical to those of the ultrasonic sensor 100 indicated in the first embodiment.

As previously described, in accordance with the ultrasonic sensor 100 and the obstruction detecting apparatus containing the ultrasonic sensor 100 which are related to the third embodiment, since the base members 131 have been divided with respect to one tube portion 132, the unwanted vibrations transferred among the waveguides 130 (tube portions 132) can be reduced, as compared with those of the ultrasonic sensor 100 shown in the first embodiment. Moreover, in the third embodiment, the unwanted vibration reducing members 150 have been arranged among the respective divided planes of the base members 131, so that the unwanted vibrations can be more effectively reduced.

It should also be understood that the structure indicated in this third embodiment may be combined with the structure shown in the first embodiment, but also may be combined with the structure represented in the second embodiment.

Fourth Embodiment

Figure 5A:
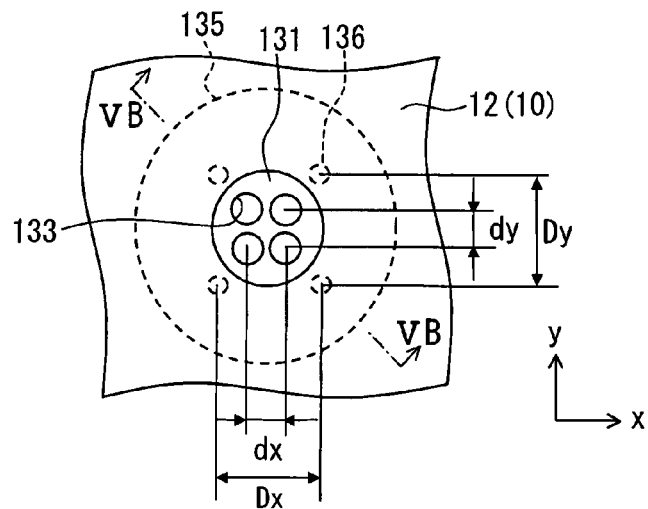
FIG. 5A and FIG. 5B are diagrams for schematically showing a structure of an ultrasonic sensor according to a fourth embodiment.
Figure 5B:
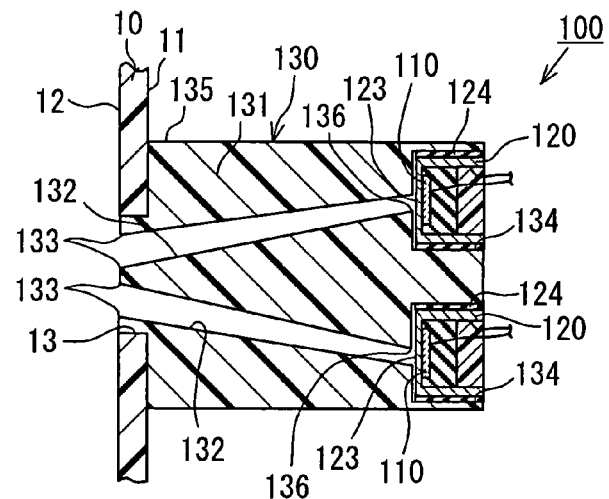

FIG. 5A and FIG. 5B are diagrams for schematically showing a structure of an ultrasonic sensor 100 according to the fourth embodiment: FIG. 5A is a plan view of the ultrasonic sensor 100; and FIG. 5B is a sectional view of the ultrasonic sensor 100, taken along a line VB-VB of FIG. 5A. It should be understood that FIG. 5A and FIG. 5B correspond to FIG. 1A and FIG. 1B respectively.

Since the ultrasonic sensor 100 and an obstruction detecting apparatus containing this ultrasonic sensor 100, according to the fourth embodiment, have many common technical ideas with respect to the ultrasonic sensor 100 and the obstruction detecting apparatus containing the ultrasonic sensor 100, which are shown in the first embodiment, a detailed description as to these common technical ideas is omitted, and different technical ideas will be mainly described in the below-mentioned specification.

In the first embodiment, the below-mentioned example has been disclosed: That is, the opening area of the opening edge 133 on the side of the bumper 10 is made smaller than the area of the outer plane 123 functioning as the vibrating plane, and furthermore, smaller than the opening area of the opening edge 136 on the side of the vibrating plane. In other words, the first embodiment has disclosed such an example that in the tube portion 132, the diameter (sectional area) of the tube portion 132 is increased from the opening edge 133 to the opening edge 136 (vibrating plane). In such an arrangement, the tube diameter (sectional area) of the tube portion 132 is increased with respect to the propagation direction of the reflection waves (reception waves). As a result, the interference within the tube portion 132 can be reduced with respect to the reflection waves. However, the tube diameter (sectional area) of the tube portion 132 is decreased with respect to the propagation direction of the transmission waves. As a result, there is a risk that the interference within the tube portion 132 may occur with respect to the transmission waves.

In contrast to the first embodiment, in this fourth embodiment, for example, as shown in FIG. 5A and FIG. 5B, while tube portions 132 having circular sectional planes have been employed, opening areas of opening edges 133 on the side of the bumper 10 have been made smaller than areas of outer planes 123 functioning as vibrating planes, and furthermore, have been made larger than opening areas of opening edges 136 on the side of vibrating planes. In other words, tube diameters (sectional areas) directed from the opening edges 133 to the opening edges 136 (vibrating planes) have been made small. It should also be noted that as viewed from the exterior portion of the vehicle, the opening edges 136 have been arranged in such a manner that these opening edges 136 are overlapped with the outer planes 123, and, small gaps have been formed between the outer planes 123 and the opening edges 136. The small gaps do not suppress the vibrations of the bottom portions 121 functioning as the vibrating plates, and also, ultrasonic waves are not leaked from the small gaps. In FIG. 5A, the indication of the outer planes 123 shown in the first embodiment is omitted and the opening edges 136 are illustrated.

As previously described, in accordance with the ultrasonic sensor 100 and the obstruction detecting apparatus containing the ultrasonic sensor 100 which are related to the fourth embodiment, in particular, the transmission waves can be transferred from the outer planes 123 to the opening edges 133 in a higher efficiency.

Figure 6:
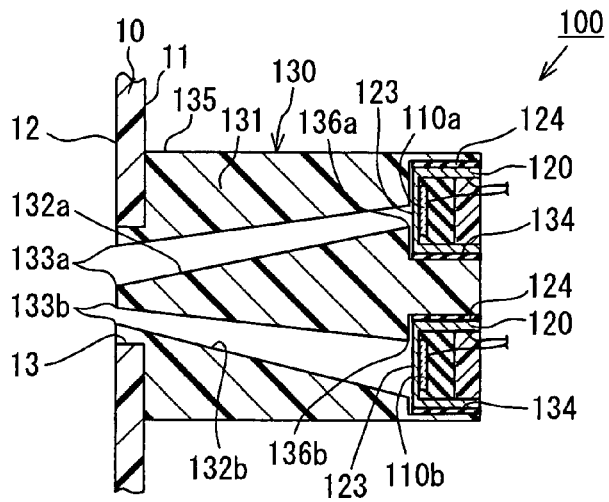
FIG. 6 is a sectional view for showing a modification of the ultrasonic sensor of the fourth embodiment.

Similar to the first embodiment, all of the piezoelectric vibrating elements 110 are operated in the transmission/reception modes in the fourth embodiment. As a result, the tube diameters (sectional areas) of the tube portions 132 become small with respect to the propagation direction of the reflection waves. Accordingly, there is a risk that the interference occurs within the tube portions 132 functioning as the reception mode. Under such a circumstance, for instance, as shown in FIG. 6, while a piezoelectric vibrating element 110 may be divided into both a piezoelectric vibrating element 110a exclusively operated in a transmission mode and a piezoelectric vibrating element 110b exclusively operated in a reception mode, a tube portion 132 may be divided into such a tube portion 132a (opening edges 133a and 136a) which is suitably operated in the transmission mode (refer to fourth embodiment) and another tube portion 132b (opening edges 133b and 133b) which is suitably operated in the reception mode (refer to first embodiment). If such a structure is employed in the ultrasonic sensor 100, then transferring efficiencies of the ultrasonic waves may be improved in both the transmission and reception modes. FIG. 6 is a sectional view for indicating the above-described modification.

Further, the fourth embodiment has exemplified such an example that the sectional shapes of the tube portions 132 are made in the circular shapes. However, the sectional shapes of the tube portions 132 are not limited only to the above-described example. For example, the sectional shapes may be made in a rectangular shape and any polygonal shapes except for this rectangular shape. However, the closer the sectional shapes of the tube portions 132 are approximated to circular shapes, the lower the interference caused the ultrasonic waves can be reduced. As a consequence, as represented in this fourth embodiment, the sectional shapes of the tube portions 132 may be preferably made in the circular sectional shapes.

It should also be understood that the structures (containing modification) indicated in this fourth embodiment may be combined with the structure shown in the first embodiment, but also may be combined with the structure represented in the second embodiment and the third embodiment.

Fifth Embodiment

Figure 7A:
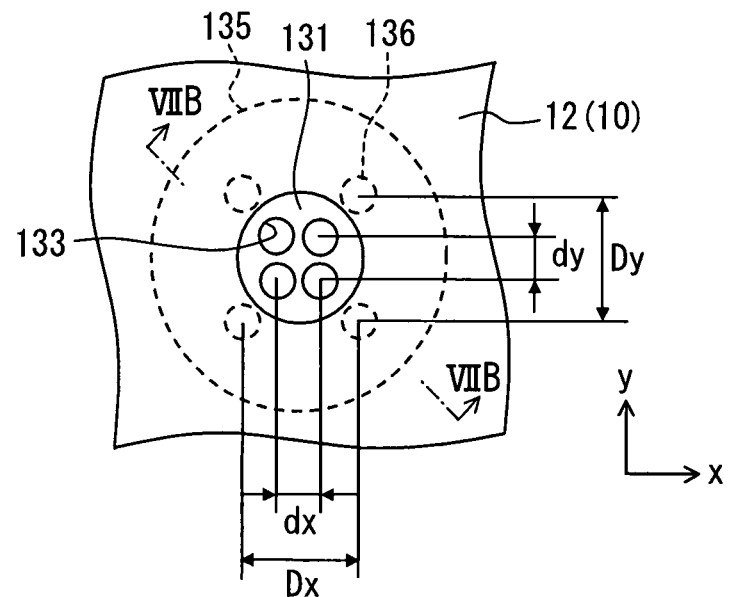
FIG. 7A and FIG. 7B are diagrams for schematically showing a structure of an ultrasonic sensor according to a fifth embodiment.
Figure 7B:
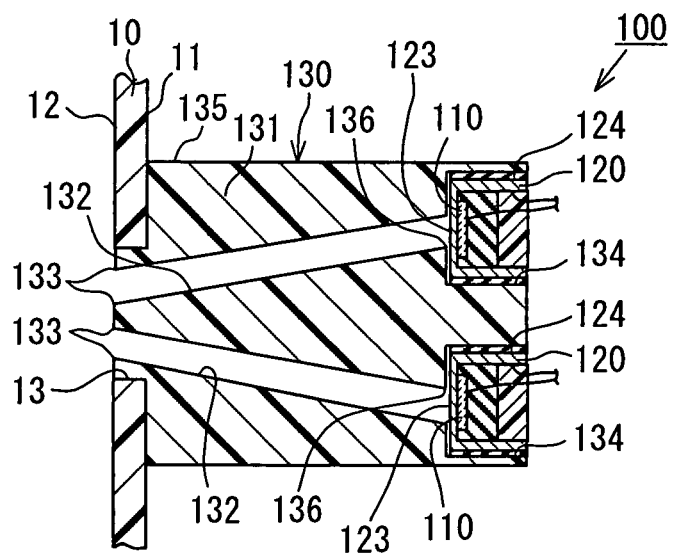

FIG. 7A and FIG. 7B are diagrams for schematically showing a structure of an ultrasonic sensor 100 according to the fifth embodiment: FIG. 7A is a plan view of the ultrasonic sensor 100; and FIG. 7B is a sectional view of the ultrasonic sensor 100, taken along a line VIIB-VIIB of FIG. 7A. It should be understood that FIG. 7A and FIG. 7B correspond to FIG. 1A and FIG. 1B respectively.

Since the ultrasonic sensor 100 and an obstruction detecting apparatus containing this ultrasonic sensor 100, according to the fifth embodiment, have many common technical ideas with respect to the ultrasonic sensor 100 and the obstruction detecting apparatus containing the ultrasonic sensor 100, which are shown in the first embodiment and the fourth embodiment, a detailed description as to these common technical ideas is omitted, and different technical ideas will be mainly described in the below-mentioned specification.

In the first embodiment, the below-mentioned example has been disclosed: That is, the tube diameters (sectional areas) of the tube portions 132 are increased from the opening edges 133 to the opening edges 136 (vibrating planes). Also, the fourth embodiment has exemplified such an example that the tube diameters (sectional areas) of the tube portions 132 are decreased from the opening edges 133 to the opening edges 136 (vibrating planes). In contrast to these embodiments, in this fifth embodiment, for example, as shown in FIG. 7A and FIG. 7B, tube diameters are made constant within tube portions 132 having circular sectional shapes. In other words, in the same tube port 132, a sectional shape and a sectional area are made constant respectively between an opening edge 133 thereof on the side of the bumper 10 and another opening edge 136 thereof on the side of the vibrating plane. Also, in this fifth embodiment, it should also be noted that as viewed from the exterior portion of the vehicle, the opening edges 136 have been arranged in such a manner that these opening edges 136 are overlapped with the outer planes 123, and, small gaps have been formed between the outer planes 123 and the opening edges 136. The small gaps do not suppress the vibrations of the bottom portions 121 functioning as the vibrating plates, and also, ultrasonic waves are not leaked from the small gaps. In FIG. 7A, the indication of the outer planes 123 shown in the first embodiment is omitted, and the opening edges 136 are illustrated.

As previously described, in accordance with the ultrasonic sensor 100 and the obstruction detecting apparatus containing this ultrasonic sensor 100, which are related to the fifth embodiment, both the sectional shapes and the tube diameters (sectional areas) are made constant respectively. As a result, interference of either transmission waves or reflection waves occurred within the tube portion 132 can be reduced. In other words, either the transmission waves or the reflection waves can be transferred in a higher efficiency between the outer planes 123 and the opening edges 133.

Similar to the first embodiment, in this fifth embodiment, all of the piezoelectric vibrating elements 110 are operated in both the transmission/reception modes, and furthermore, the sectional shapes and the tube diameters (sectional areas) in all of the tube portions 132 are made constant respectively. However, as the plurality of tube portions 132, at least any one of the tube portions 132 shown in the first embodiment and the tube portions 132 indicated in the fourth embodiment may be alternatively provided in combination with the tube portions 132 represented in this fifth embodiment.

Further, the fifth embodiment has exemplified such an example that the sectional shapes of the tube portions 132 are made in the circular shapes. However, the sectional shapes of the tube portions 132 are not limited only to the above-described example. For example, the sectional shapes may be made in a rectangular shape and any polygonal shapes except for this rectangular shape. In any of these sectional shapes, sectional areas between the opening edges 133 on the side of the bumper 10 and the opening edges 136 on the side of the vibrating planes may be made constant. However, the closer the sectional shapes of the tube portions 132 are approximated to circular shapes, the lower the interference caused by the ultrasonic waves can be reduced. As a consequence, as represented in this fifth embodiment, the sectional shapes of the tube portions 132 may be preferably made in the circular sectional shapes.

It should also be understood that the structure indicated in this fifth embodiment may be combined with the structure shown in the second embodiment, but also may be combined with the structure represented in the third embodiment.

In the embodiments, such an exemplification has been disclosed that the ultrasonic sensor 100 has been mounted on the bumper 10 of the vehicle as the moving object. However, this moving object is not limited only to the vehicle, but also, the sensor mounting unit is not limited only to the bumper 10. Even when a vehicle is employed, the ultrasonic sensor 100 may be mounted on, for example, a body of this vehicle.

Figure 8:
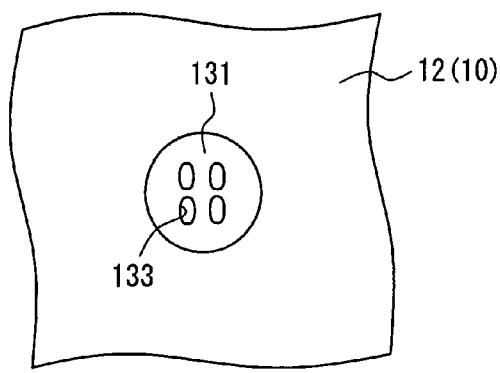
FIG. 8 is a plan view for indicating a modification of the ultrasonic sensor of the fifth embodiment.

The fifth embodiment has exemplified such an example that the opening shapes of the opening edges 133 are the circular shapes, which are exposed to the outer plane 12 side of the bumper 10 in the plurality of tube portions 132. However, an opening shape of each of the opening edges 133 may be alternatively formed as shown, for example, in FIG. 8. That is, lengths of the opening shape are different from each other along two axial directions (namely, both horizontal direction and vertical direction with respect to road plane in FIG. 8 similar to FIG. 1) located perpendicular to the opening planes. In accordance with this alternative case, directivity of the ultrasonic sensor may be different from each other in the two axial directions (namely, deviated directivity may be achieved). It should be noted that in accordance with the structure shown in FIG. 8, since the opening width becomes narrow along the horizontal direction and becomes wide along the vertical direction, the ultrasonic sensor 100 may have the wide directivity along the horizontal direction and the narrow directivity along the vertical direction. FIG. 8 is a plan view for showing this modification and corresponds to FIG. 1A.

Figure 9:
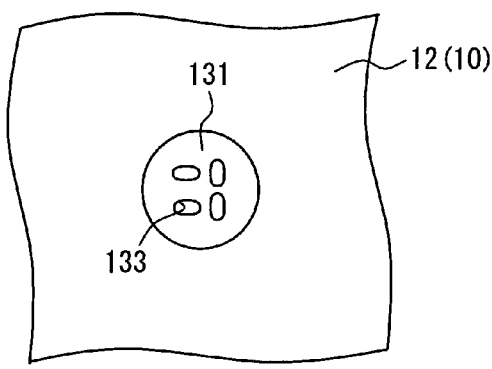
FIG. 9 is a plan view for indicating another modification of the ultrasonic sensor of the fifth embodiment.

The fifth embodiment has exemplified such an example that all of the opening shapes and the opening dimensions of the opening edges 133 which are exposed to the outer plane 12 side of the bumper 10 are set to be equal to each other in the plurality of tube portions 132. However, as indicated in, for example, FIG. 9, opening shapes may be alternatively set to be plural different shapes (at least one opening edge 133 is different from other opening edge 133). Since the directivity of the ultrasonic sensor 100 is determined based upon the shapes and dimensions of the opening edges 133, the directivity may be switched in response to the opening shapes. It should be understood that in the structure shown in FIG. 9, among 4 pieces of the opening edges 133, opening widths as to two pieces of the opening edges 133 are made narrow along the horizontal direction and made wide along the vertical direction, whereas opening widths as to two pieces of the remaining opening edges 133 are made wide along the horizontal direction and made narrow along the vertical direction. FIG. 9 is a plan view for showing this modification, and corresponds to FIG. 1A.

Figure 10A:
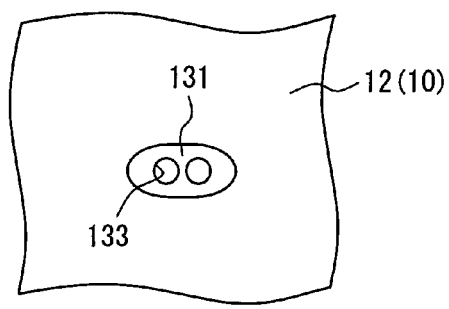
FIG. 10A and FIG. 10B are plan views for representing another modification of the ultrasonic sensor of the fifth embodiment.
Figure 10B:
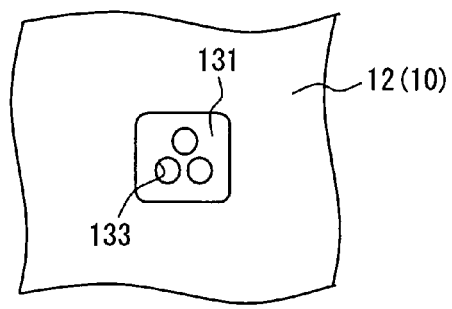

Also, the fifth embodiment has exemplified the below-mentioned example: That is, while the ultrasonic sensor 100 has contained 4 pieces of the piezoelectric vibrating elements 110 equipped with the reception function in order to detect the azimuth of the obstruction over the wide range in both the vertical direction and the horizontal direction with respect to the road plane, two pieces of the corresponding opening edges 133 have been arranged in the parallel manner along the respective directions with respect to the base member 131 which is exposed to the outer plane 12 side of the bumper 10. However, a total number of the piezoelectric vibrating elements 110 and the arrangement of the opening edges 133 are not limited only to those of the above-described example. That is, while the ultrasonic sensor 100 may alternatively contain at least two pieces of the piezoelectric vibrating elements 110 having the reception function, the opening edges 133 may be alternatively arranged in the parallel manner in order that the obstruction detecting apparatus may calculate the azimuth of the obstruction based upon the phase difference of these reception signals. For example, as shown in FIG. 10A, the ultrasonic sensor 100 may be alternatively arranged by that in correspondence with two pieces of the piezoelectric vibrating elements 110 having the reception function, two pieces of the opening edges 133 are arranged in the parallel manner along the horizontal direction with respect to the road plane. Also, as represented in FIG. 10B, in contrast to FIG. 10A, in correspondence with three pieces of the piezoelectric vibrating elements 110 having the reception function, three pieces of the opening edges 133 may be arranged in a triangular shape. In the case of the structure shown in FIG. 10A, the azimuth of the obstruction may be detected over a wide range in the horizontal direction with respect to the road plane. Also, similar to the structure shown in the first embodiment, in the case of the structure shown in FIG. 10B, the azimuth of the obstruction may be detected over wide ranges respectively in the horizontal direction and the vertical direction with respect to the road plane. Also, the total number of the tube portions 132 corresponding to the piezoelectric vibrating elements 110 is smaller than that of the structure shown in the first embodiment. As a result, the ultrasonic sensor 100 may be made simpler and in lower cost. FIG. 10A and FIG. 10B are plan views for showing these modifications, and correspond to FIG. 1A.

Figure 11:
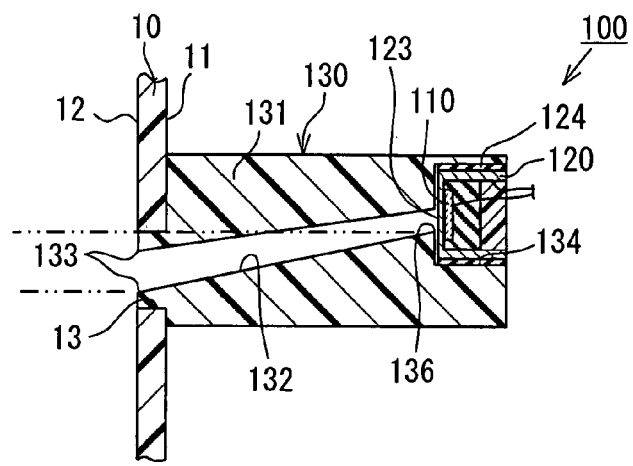
FIG. 11 is a sectional view for representing another modification of the ultrasonic sensor of the fifth embodiment.

The fifth embodiment has described such an exemplification that two pieces of the tube portions 132 among 4 pieces of the tube portions 132 are contained in which the opening lower positions of the opening edges 133 on the side of the bumper 10 are located above the lower positions of the opening edges 136 on the side of the vibrating planes along the gravity direction. In other words, such an example has been described that the tube portions 132 are inclined downwardly directed from the opening edges 133 to the opening edges 136 (outer planes 123). In the tube portions 132 having such a structure, if the acoustic matching members 140 shown in the second embodiment are not filled in the tube portions 132, then there is a risk that such a foreign article as stone, water, and mud are penetrated thereinto. In other words, there is a risk that the detection precision is lowered by the foreign article. As a consequence, for example, as indicated in FIG. 11, as the plurality of tube portions 132, only such tube portions 132 may be contained in which the opening lower positions of the opening edges 133 on the side of the bumper 10 are located below the lower positions of the opening edges 136 on the side of the vibrating planes along the gravity direction. In other words, such an example has been described that the tube portions 132 are inclined upwardly directed from the opening edges 133 to the opening edges 136 (outer planes 123). If such an arrangement is employed, then it may suppress that the foreign article is penetrated into the tube portion 132, as compared with the above-explained arrangement that the tube portions 132 are inclined downwardly. It should also be noted that the structure shown in FIG. 11 has been applied to each of the tube portions 132 in such a structure that the two opening edges 133 are arranged in the parallel manner along the horizontal direction with respect to the road plane, as shown in FIG. 10A. FIG. 11 is a sectional view for indicating the above-explained modification.

Figure 12:
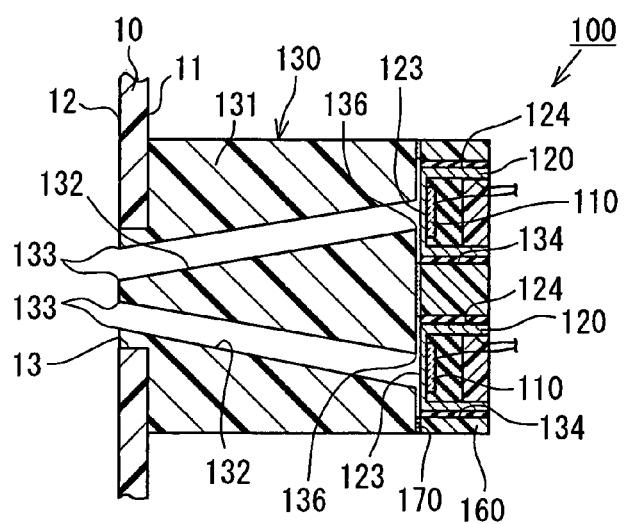
FIG. 12 is a sectional view for representing a further modification of the ultrasonic sensor of the fifth embodiment.

The fifth embodiment has described such an exemplification. That is, while the fixing-purpose grooves 134 communicated with the tube portions 132 are formed in the base member 131, at least portions of the outer planes 123 functioning as the vibrating planes are exposed from the opening edges 136 of the tube portions 132 under such a condition that the housings 120 containing the piezoelectric vibrating elements 110 have been fixed in the fixing-purpose grooves 134, so that the ultrasonic waves can be transmitted and/or received via the tube portions 132. However, the below-mentioned structure may be alternatively employed. That is, for instance, as represented in FIG. 12. While a holding member 160 to which the housing 120 containing the piezoelectric vibrating elements 110 are fixed may be provided independent from the base member 131, at least portions of the outer planes 123 which are exposed from the holding member 160 may be exposed from the opening edges 136 of the tube portions 132 under such a condition that the holding member 160 is fixed on the base member 131 via an adhesive tape 170. In the structure shown in FIG. 12, since a function as a spacer is given to the adhesive tape 170, a small gap may be secured between the outer planes 123 and the opening edges 136 while this small gap does not suppress the vibrations of the bottom portions 121 as the vibrating plates and further does not leak the ultrasonic waves therefrom. FIG. 12 is a sectional view for indicating the above-described modification. In FIG. 12, although such an example is shown that the holding member 160 is fixed on the base member 131 by employing the adhesive tape 170, the fixing method is not limited only to the above-described example.

Also, the fifth embodiment has exemplified such an example that the intervals "d" of the adjacent opening edges 133 are made equal to each other along both the horizontal direction "dx" and the vertical direction "dy" with respect to the road plane. However, it is possible to arrange that the interval "d" of the opening edges 133 may be made narrower than the distance D(Dx, Dy) between the corresponding vibrating planes (outer planes 123). As a consequence, such intervals which are different from each other along both the horizontal direction "dx" and the vertical direction "dy" may be alternatively set. Also, in FIG. 1A, such an interval between two sets of the opening edges 133 which are located adjacent to each other along a diagonal direction (namely, are located at diagonal positions) may be set as the interval "d."

Sixth Embodiment

Figure 13:
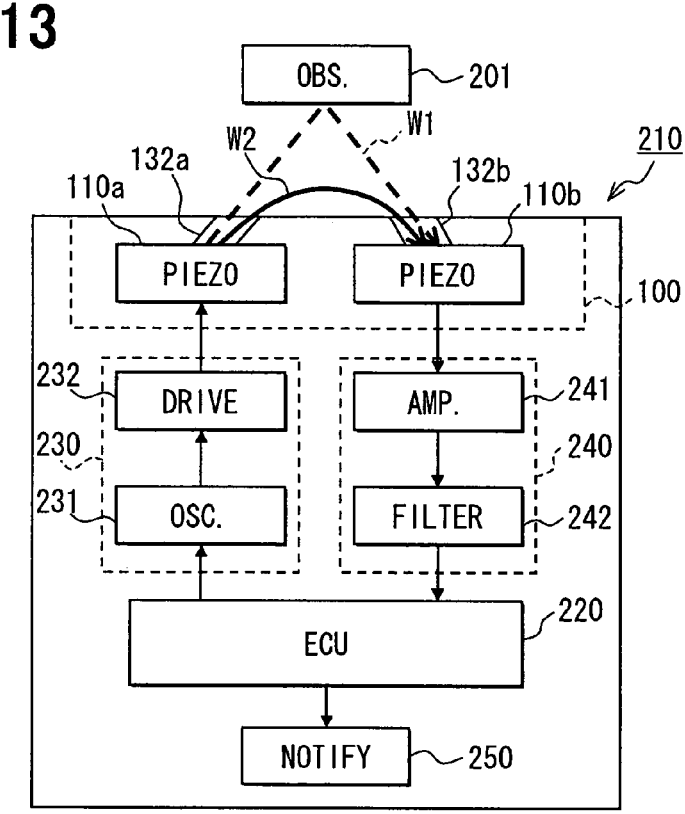
FIG. 13 is a structural diagram for indicating an entire structure of an ultrasonic sensor apparatus according to a sixth embodiment.
Figure 14:
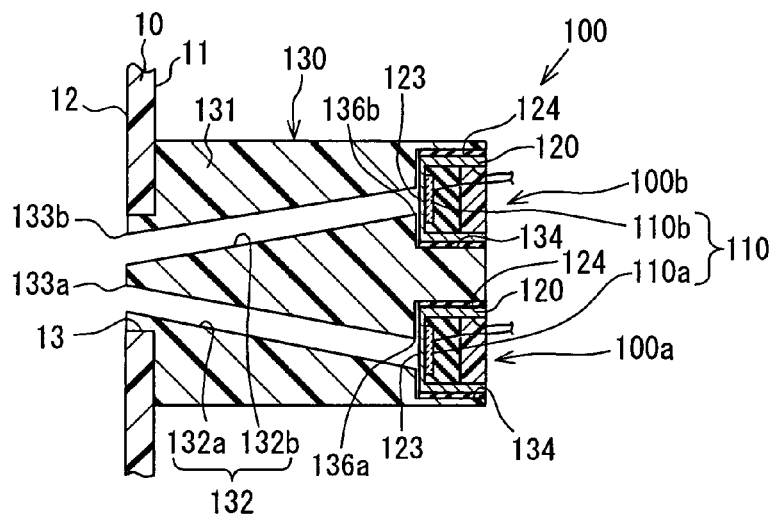
FIG. 14 is a sectional view for schematically showing a structure of an ultrasonic sensor employed in the ultrasonic sensor apparatus of FIG. 13.
Figure 15:
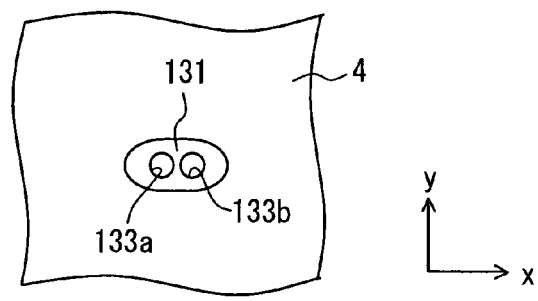
FIG. 15 is a plan view of the ultrasonic sensor of FIG. 14, as viewed from an outer plane side of a moving object.
Figure 16:
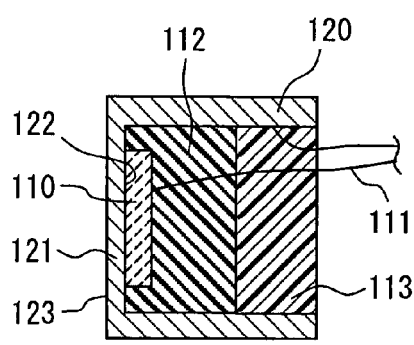
FIG. 16 is a sectional view for showing an enlarged housing peripheral portion of the ultrasonic sensor shown in FIG. 14.

FIG. 13 is a structural diagram for indicating an entire structure of an ultrasonic sensor apparatus 210 according to a sixth embodiment. FIG. 14 is a sectional view for schematically showing a structure of an ultrasonic sensor employed in the ultrasonic sensor apparatus 210 of FIG. 13. FIG. 15 is a plan view of the ultrasonic sensor of FIG. 14, as viewed from an outer plane side of a moving object. FIG. 16 is a sectional view for showing an enlarged housing peripheral portion of the ultrasonic sensor shown in FIG. 14. It should be noted that FIG. 14 and FIG. 15 represent such a condition that the ultrasonic sensor has been mounted on a mounting portion of the moving object.

In the sixth embodiment, a description is made of an example in which the ultrasonic sensor apparatus 210 is employed in a vehicle functioning as the moving object. Concretely speaking, an ultrasonic sensor has been mounted on, for example, a forward bumper, a backward bumper, or bumpers on the side of 4 corners of the vehicle in order that an obstruction present around the vehicle can be detected.

As indicated in FIG. 13, the ultrasonic sensor apparatus 210 is provided with, as a major unit, an ultrasonic sensor 100, an ECU (Electronic Control Unit) 220, a drive signal producing unit 230, a reception signal processing unit 240, and a notifying unit 250.

As shown in FIG. 14, the ultrasonic sensor 100 contains, as a major structural element, a piezoelectric vibrating element 110, a housing 120, and two sets of ultrasonic sensors 100a and 100b. The housing 120 stores thereinto the piezoelectric vibrating element 110 and the like. The ultrasonic sensors 100a and 100b have tube portions functioning as a waveguide which guides ultrasonic waves between the piezoelectric vibrating element 110 and an exterior portion of the vehicle. It should also be understood that the housing 120 containing the piezoelectric vibrating element 110 corresponds to an "ultrasonic element".

The piezoelectric vibrating element 110 has been formed in, for example, a disk shape. While piezoelectric ceramics such as barium titanate and PZT are manufactured as a sintered body, a voltage is applied to this sintered body so as to generate vibrations from the piezoelectric vibrating element 110. In the sixth embodiment, as the piezoelectric vibrating element 110, 2 pieces of piezoelectric vibrating elements 110a and 110b have been provided in such a manner that these two piezoelectric vibrating elements 110a and 110b are arranged side by side along a horizontal direction (namely, "x" direction shown in FIG. 15) with respect to a path plane. It should also be understood that the piezoelectric vibrating element 110a plays a role of transmitting ultrasonic waves outside the vehicle, whereas the piezoelectric vibrating element 110b plays a role of receiving ultrasonic waves.

While electrodes (not shown) have been formed on the surface of the piezoelectric vibrating element 110, leads 111 have been electrically connected to the electrodes. In the sixth embodiment, as indicated in FIG. 16, one of the leads 111 has been connected to an inner plane of the housing 120 electrically connected to the electrodes. Then, the leads 111 have been electrically connected to a circuit board (not shown) on which a processing circuit has been formed. The processing circuit outputs a drive signal which is used to vibrate the piezoelectric vibrating element 110 in order to generate ultrasonic waves, and inputs such a voltage signal produced due to the piezoelectric effect in such a case that ultrasonic waves are propagated to the piezoelectric vibrating element 110, so that distortions are produced in the piezoelectric vibrating element 110. As a consequence, the ultrasonic sensor apparatus 210 can calculate a distance measured up to an obstruction present around the vehicle based upon times measured from the transmission of the ultrasonic waves until the reception of the ultrasonic waves and/or echoes thereof.

For accommodating each one piezoelectric vibrating element 110 (110a, 110b), The housing 120 has been provided in a cylindrical shape having a bottom, while aluminum, or a synthetic resin, for example (note that aluminum is used in sixth embodiment) is employed as a structural material. Then, as represented in FIG. 16, the piezoelectric vibrating element 110 has been installed (for example, fixed) on an inner plane 122 of a bottom portion 121. In other words, the arranged bottom portion 121 of the piezoelectric vibrating element 110 plays a role as a vibrating plate, and an outer plane 123 (namely, rear plane of inner plane 122) of the bottom portion 121 constitutes a vibrating plane.

Also, as shown in FIG. 16, a sound absorbing member 112 has been arranged at a peripheral portion of the piezoelectric vibrating element 110 except for such a place which is faced to the inner plane 122. This sound absorbing member 112 is employed so as to absorb ultrasonic waves which are radiated within the housing 120, since the piezoelectric vibrating element 110 is stretched/compressed, so that the bottom portion 121 of the housing 120 is vibrated. The sound absorbing member 112 is made of a material, for example, a silicon sponge having superior sound absorbing performance. Then, while a sealing member 113 has been provided on the sound absorbing member 112, an interior portion of the housing 120 has been air-tightly sealed by this sealing member 113.

As shown in FIG. 14, the waveguide unit 130 has been arranged in order to conduct ultrasonic waves between an exterior portion of the vehicle and the piezoelectric vibrating element 110 (namely, outer plane 123 as vibrating plane) arranged in an interior portion of the vehicle (inner plane 11 side of bumper 10). That is, in the sixth embodiment, the waveguide unit 130 may conduct ultrasonic waves from the outer plane 123 of the housing 120 where the piezoelectric vibrating element 110a has been arranged to the exterior portion of the vehicle, and also may conduct ultrasonic echoes from the exterior portion of the vehicle to the external plane 123 of the housing 120 where the piezoelectric vibrating element 110b has been arranged. As to the waveguide unit 130 according to the sixth embodiment, two pieces of tube portions 132 functioning as the waveguides have been formed with respect to a base member 131 made of, for example, a resin material. It should also be noted that within the two tube portions 132, the housing 120 containing the piezoelectric vibrating element 110a has been fixed on an opening edge 136a of the tube portion 132a, whereas the housing 120 containing the piezoelectric vibrating element 110b has been fixed on an opening edge 136b of the tube portion 132b. As previously explained, the ultrasonic sensor 100a has been constructed in such a manner that this ultrasonic sensor 100a has the housing 120 containing the piezoelectric vibrating element 110a and the tube portion 132a, whereas the ultrasonic sensor 100b has been constructed in such a manner that this ultrasonic sensor 100b has the housing 120 containing the piezoelectric vibrating element 110b and the tube portion 132b.

As represented in FIG. 14, opening edges 133a and 133b of the tube portions 132a and 132b on the side of the bumper 10 have been opened in such a manner that these opening edges 133a and 133b are located in close proximity to each other on the same plane of the base member 131, and have been exposed via a through hole 13 of the bumper 10 to the exterior portion of the vehicle under such a condition that these opening edges 133a and 133b are mounted on the bumper 10. Also, the other opening edge 136a and the other opening edge 136b have been coupled to a fixing-purpose groove 134 respectively, which has been formed on a plane of the base member 131 which is located opposite to an opening edges forming plane. This fixing-purpose groove 134 corresponds to a groove into which the housing 120 containing the piezoelectric vibrating element 110 is fixed.

Also, as shown in FIG. 14, with respect to the tube portions 132a and 132b, opening areas of the respective opening edges 133a and 133b have been set to become smaller than areas of the corresponding outer planes 123 functioning as the vibrating planes. In the sixth embodiment, while the above-described condition can be satisfied, the opening edges 133a and 133b have been made in circular shapes whose shapes and dimensions are equal to each other, and further, a plurality of the corresponding outer planes 123 have been set to become equal shapes and equal dimensions. Further, sectional shapes (namely, circular sectional shapes in sixth embodiment) and sectional areas of the respective tube portions 132a and 132b between the opening edges 133a and 133b on the side of the bumper 10, and the opening edges 136a and 136b on the side of the vibrating planes have been made constant respectively.

Also, as indicated in FIG. 14, an opening interval between the adjoining opening edges 133a and 133b is set to be narrower than a corresponding interval between the adjoining outer planes 123, and further, is set to be shorter than, or equal to a half-wave length with respect to a wavelength of a ultrasonic wave (namely, opening interval is set to a half-wave length in sixth embodiment). In addition, lengths of the plural tube portions 132a and 132b have been set to become equal to each other.

The waveguide unit 130 constructed in the above-described manner has been fixed on the bumper 10 under such a condition that the housing 120 containing the piezoelectric vibrating element 110 is fixed in the fixing-purpose groove 134. In the sixth embodiment, a portion of the base member 131 containing the opening portions 133a and 133b has been inserted into the through hole 13 of the bumper 10, whereas another portion of the base member 131 which is located opposite to the inner plane 11 of the bumper 10 has been adhered and fixed with respect to the inner plane 2. Then, under this fixed condition, both the opening edges 133a and 133b are made in a co-planer condition with respect to the outer plane 12 of the bumper 10. It should also be understood that the housing 120 containing the piezoelectric vibrating element 110 has been fixed via a vibration absorbing member 124 in the corresponding fixed-purpose groove 134 in such a manner that the outer planes 123 functioning as the vibrating planes are located on the side of the opening edges 133a and 133b. Also, under such a condition that the housing 120 is fixed in the fixing-purpose groove 134, the opening edges 136a and 136b of the tube portions 132a and 132b have been brought into such a condition that these opening edges 136a and 136b are arranged on the side of the opening edges 133a and 133b with having a small gap with respect to the outer plane 123. In other words, the bottom portion 121 functioning as the vibrating plate is not directly contacted to the base member 131 which constitutes the waveguide unit 130, but also, the base member 131 does not suppress vibrations of the bottom portion 121.

The ECU 220 is a usual computer which is arranged by a CPU, a ROM, a RAM, an I/O, and a bus for connecting these structural units to each other. These structural units are not shown. The ECU 220 outputs a drive instruction signal and a self-diagnostics drive instruction signal as to the piezoelectric vibrating element 110a at predetermined timing. Also, the ECU 220 detects detour waves and reflection waves (will be explained later) based upon reception signals of the piezoelectric vibrating element 110b, and also, detects a peak value of the detour waves based on the reception signals. Then, when no detour wave is detected, or in such a case that a peak value of the detour waves is different from a first reference value which has been previously set, the ECU 220 judges that an abnormal event occurs in the ultrasonic sensor 100. Thereafter, the ECU 220 controls an output of the notifying unit 250 in such a manner that this judgment result is notified by the notifying unit 250. As previously described, the ECU 220 according to the sixth embodiment is provided with a storage function, a judgment function, a calculation function, and a control function.

The drive signal producing unit 230 includes an oscillating circuit 231 and a driving circuit 232. Upon receipt of either the drive instruction signal or the self-diagnostic drive instruction signal supplied from the ECU 220, the oscillating circuit 231 outputs a pulse signal to the driving circuit 232. The pulse signal has a predetermined frequency which has been previously set. Then, the driving circuit 232 is driven by receiving an apply of a power supply voltage inputted to the piezoelectric vibrating element 110a, and drives the piezoelectric vibrating element 110a in response to the pulse signal (drive signal) supplied from the oscillating circuit 231. As a result, the piezoelectric vibrating element 110a is driven in a transmission vibration mode, so that transmission waves (ultrasonic waves) are transmitted via the bottom portion 121 of the housing 120 shown in FIG. 14 to the exterior portion of the vehicle.

The detection signal processing unit 240 contains an amplifying circuit 241 and a filter circuit 242. The filter circuit 242 selectively outputs only such signals of a predetermined frequency range among electric signals which are outputted from the piezoelectric vibrating element 110b, while the piezoelectric vibrating element 110b converts vibrations (ultrasonic echoes) into the electric signals. As a consequence, such signals which have been amplified and filtered are entered to the ECU 220.

As previously explained, the notifying unit 250 issues notification to a passenger of the vehicle in response to a judgment result, and a calculation result of the ECU 220. In the sixth embodiment, an alarm sound output apparatus and a display apparatus have been employed as the notifying units 50.

Figure 17:
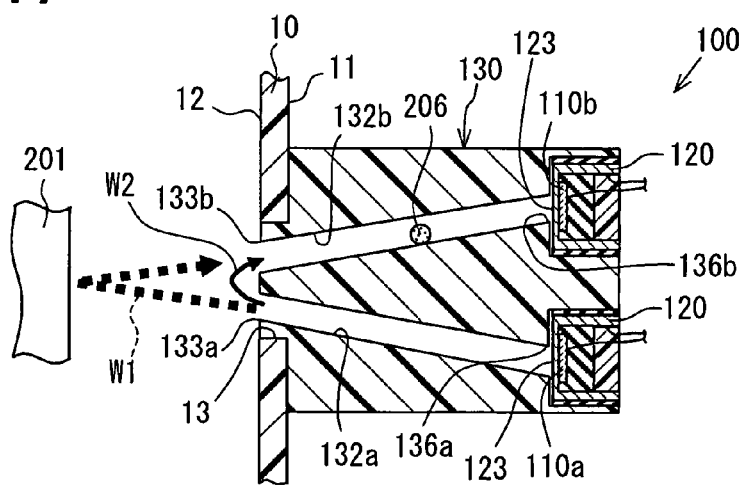
FIG. 17 is an explanatory diagram for explaining reflection waves and detour waves.
Figure 18A:
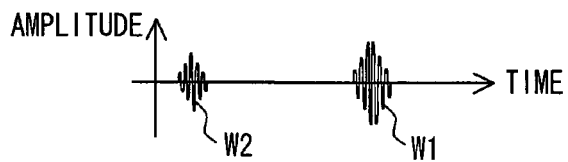
FIG. 18A to FIG. 18C are diagrams for showing changes in reception signals in connection with checking as to whether or not abnormal events occur.
Figure 18B:
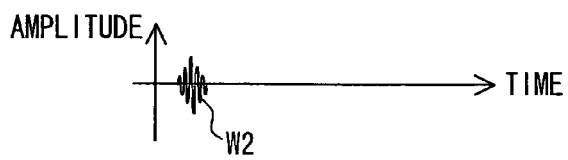
Figure 18C:
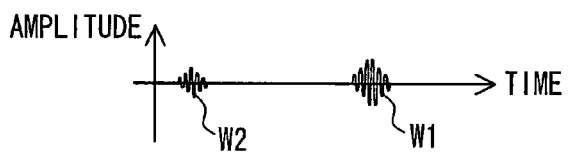

Next, a description is made of a basic idea for judging whether or not an abnormal event of the ultrasonic sensor apparatus 210 is present based upon detour waves with reference to FIG. 17 and FIGS. 18A-18C. FIG. 17 is an explanatory diagram for explaining reflection waves and detour waves. FIG. 18A to FIG. 18C are diagrams for showing changes in reception signals in connection with checking as to whether or not abnormal events occur: FIG. 18A indicates such a status that an abnormal event is not present and an obstruction is present; FIG. 18B shows such a status that an abnormal event is not present and an obstruction is not present; FIG. 18 indicates such a status that an abnormal event is present and an obstruction is present.

Conventionally, the following nature of sound waves is known. That is, the sound waves have such a nature that when a shielding article, or the like is present, the sound waves detour to a rear side of this shielding article. The higher the frequency of the sound waves is increased (namely, wavelengths are short), the weaker this detour nature becomes, whereas the lower the frequency of the sound waves is decreased (namely, wavelengths are long), the stronger the detour nature becomes. As indicated in the sixth embodiment, generally speaking, frequencies of the ultrasonic sensor apparatus 210 which is applied to a vehicle-purpose obstruction detecting apparatus are approximately 40 to 70 KHz, namely low frequencies, and thus, the frequencies of this ultrasonic sensor apparatus 210 are selected to be the frequencies (for example, 40 KHz) within this frequency range in this sixth embodiment. As a consequence, in the structure shown in the sixth embodiment, in such a case that an obstruction 201 is located outside the vehicle, as represented in FIG. 17, both a reflection wave "W1" caused by the obstruction 201 and a detour wave "W2" are propagated within the reception-purpose tube portion 132b based upon ultrasonic waves generated from the piezoelectric vibrating element 110a in the transmission vibration mode.

Due to the above-described detour nature of the ultrasonic waves, the detour wave "W2" is directly detoured from the opening edge 133a of the tube portion 132a where the transmission-purpose piezoelectric vibrating element 110a has been arranged via the opening edge 133b located in the vicinity of this opening edge 133a to the tube portion 132b where the reception-purpose piezoelectric vibrating element 110b has been arranged, and then, the detour wave W2 is propagated. As explained above, the ultrasonic propagation path of the detour wave W2 is shorter than that of the reflection wave W1, and the obstruction 201 is not involved in the ultrasonic propagation path. As a result, the detour wave W2 is not adversely influenced by the nature of the obstruction 201, for instance, presence/absence of the obstruction 201, a distance from the obstruction 201, and sorts (surface concave/convex, acoustic impedance etc.) of the obstruction 201. As a consequence, changes in the ultrasonic sensor apparatus 210 (ultrasonic sensor 100) may be strongly reflected as to the detour wave W2, which is different from the reflection wave W1. In accordance with this sixth embodiment, presence/absence of an abnormal event in the ultrasonic sensor apparatus 210 may be self-diagnosed based upon a reception signal caused by this detour wave W2.

For instance, in such a case that an abnormal event is not present in the ultrasonic sensor apparatus 210 (both piezoelectric vibrating element 110 and tube portion 132), and further, the obstruction 201 is present, a reception signal detected by the piezoelectric vibrating element 110b is represented in FIG. 18A. As indicated in FIG. 18A, a detour wave "W2" of a short propagation path is firstly detected, and thereafter, a reflection wave "W1" is detected.

In contrast to the above-described case, when the obstruction 201 is removed from the condition indicated in FIG. 18A, (namely, in such a case that no abnormal event is present in ultrasonic sensor apparatus 210 and no obstruction 201 is present), a reception signal detected by the piezoelectric vibrating element 110b is caused only by the detour wave W2, as indicated in FIG. 18B. At this time, the reception signal caused by the detour wave W2 is not substantially changed from the reception signal of FIG. 18A, since there is no influence caused by the obstruction 201.

Also, in such a case that a foreign article 206 is positioned inside the tube portion 132 (for instance, as shown in FIG. 17, foreign article 206 is positioned in reception-purpose tube portion 132b) from the condition shown in FIG. 18A (namely, in such a case that abnormal event is present in ultrasonic sensor apparatus 210 and obstruction 201 is present), both the detour wave W2 and the reflection wave W1 are influenced by at least one abnormal event present in the piezoelectric vibrating element 110 (elements 110a and 110b) and the tube portion 132 (tube portions 132a and 132b). As a consequence, a reception signal is changed from the condition of FIG. 18A (refer to FIG. 18C). Precisely speaking, in the case where the foreign article 206 such as stone has been entered into the tube portion 132b and thus the tube portion 132 has been brought in to an abnormal condition, a reflection of ultrasonic waves occurs due to a difference between an acoustic impedance of the foreign article 206 and an acoustic impedance of the medium (namely, air in sixth embodiment) within the tube portion 132b. As a consequence, as represented in FIG. 18C, amplitudes (peak values) of reception signals caused by the detour wave W2 and the reflection wave W1 become small respectively, as compared with the amplitude of the condition shown in FIG. 18A.

As previously described, different from the reflection wave W1, since the detour wave W2 is not influenced by the obstruction 201, the self-diagnosis can be carried out to check whether or not the abnormal event of the ultrasonic sensor apparatus 210 is present based upon the reception signal caused by the detour wave W2. It should be understood that since the reflection wave W1 corresponds to such a reflection wave caused by the obstruction 201, the reflection wave W1 is changed by the obstruction 201. For example, not only when the obstruction 201 is not present, but also when the obstruction 201 is present, there are some possibilities that the reflection wave cannot be detected. Moreover, a strength of a reception signal may be changed, depending upon distances measured from the obstruction 201, and sorts of the obstructions 1. Accordingly, it is practically difficult to self-diagnose the ultrasonic sensor apparatus 210 based upon the reception signal caused by the reflection wave W1.

Figure 19:
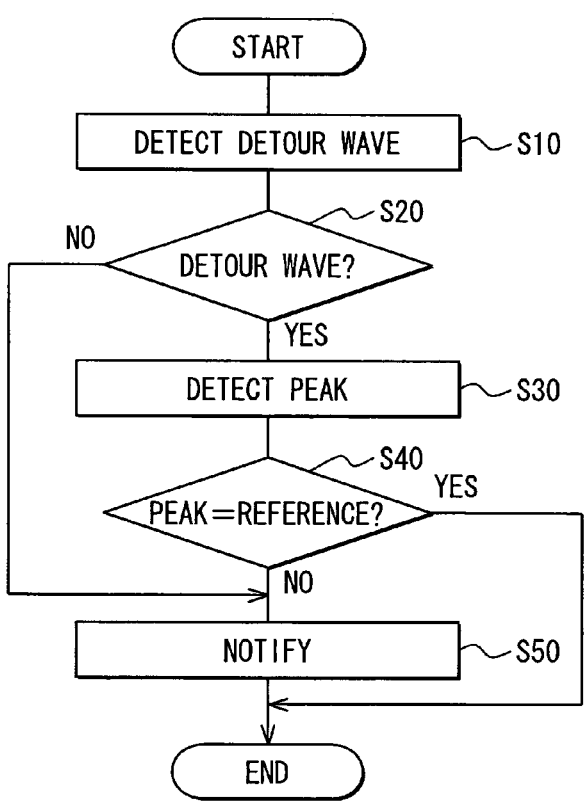
FIG. 19 is a flow chart for describing an example as to process operations for judging whether or not an abnormal event of the ultrasonic sensor apparatus is present.

While various sorts of judging methods for judging (self-diagnosing) whether or not an abnormal event of the ultrasonic sensor apparatus 210 is present based upon a reception signal caused by a detour wave "W2" may be conceived, one example thereof will now be described with reference to FIG. 19. FIG. 19 is a flow chart for describing one example as to the process operations for judging whether or not the abnormal event of the ultrasonic sensor apparatus 210 is present. This process operation is executed, for example, at a time when an IG key is turned ON.

Firstly when the IG key is turned ON, the ECU 220 issues a self-diagnostic drive signal producing instruction to the oscillating circuit 231 of the drive signal producing circuit 30. Upon receipt of this self-diagnostic drive signal producing instruction, the drive signal producing unit 230 outputs a self-diagnostic drive signal to the transmission-purpose piezoelectric vibrating element 110a. Then, the piezoelectric vibrating element 110a is vibrated in the transmission mode, so that transmission waves (ultrasonic waves) are outputted from the piezoelectric vibrating element 110a via the bottom portion 121 of the housing 120. The transmission waves are conducted into the tube portion 132a and are then outputted from the opening edge 133a to the exterior portion of the vehicle.

Among the transmission waves outputted from the opening edge 133a to the exterior portion, a detour wave "W2" is propagated from the opening edge 133b into the reception-purpose tube portion 132b, while the opening edge 133b is located in close proximity to the opening edge 133a. Then, when the detour wave W2 is induced into the tube portion 132b and is then propagated from the opening edge 136b to the bottom portion 121 of the housing 120, the reception-purpose piezoelectric vibrating element 110b converts vibrations of the bottom portion 121 into an electric reception signal.

If there is no specific abnormal event, then the following signal propagation is necessarily performed: That is, the detour wave W2 should reach the piezoelectric vibrating element 110b for a substantially constant time duration after the ECU 220 has issued the drive signal producing instruction to the drive signal producing unit 230. As a consequence, during a predetermined time after the ECU 220 has issued the drive signal producing instruction to the drive signal producing unit 230, the piezoelectric vibrating element 110b detects the detour wave W2 (step S10), and then, the ECU 220 judges whether or not the detour wave W2 is present based upon the detection result (step S20). It should be understood that the above-described predetermined time includes such a time duration after the drive signal producing instruction has been issued until the detection of the detour wave W2 is completed, and further, is set within a time duration until a detection of a reflection wave W1 is commenced.

In the case that the detour wave W2 is not detected, it is predictable that at least any one of the piezoelectric vibrating elements 110a and 110b is malfunction, or at least any one of the tube portions 132a and 132b is blocked. As a consequence, the ECU 220 judges that the ultrasonic sensor apparatus 210 is under abnormal status, and thus, outputs a notification instructing signal to the notifying unit 250. Then, the notifying unit 250 notifies the abnormal status to a passenger by way of the alarm sound and a display on the monitor (step S50), so that the self-diagnosing process operation is accomplished.

When the detour wave W2 is detected, the ECU 220 detects a peak value (amplitude) of the detour wave W2 based upon the reception signal of the detour wave W2 (step S30). Then, the ECU 220 judges whether or not the detected peak value is made coincident with a reference value which has been previously stored in the memory (step S40). This reference value corresponds to a first reference value.

When the detected peak value is substantially made coincident with the reference value, the ECU 220 judges that no abnormal event occurs in the piezoelectric vibrating element 110 (elements 110a and 110b) and also in the tube portion 132 (tube portions 132a and 132b), and thus, the self-diagnosing process operation is accomplished.

In such a case that the detected peak value is different from the first reference value, it is predictable that at least any one of the piezoelectric vibrating elements 110a and 110b is malfunction, or a foreign article is entered into at least any one of the tube portions 132a and 132b. As a consequence, the ECU 220 judges that the ultrasonic sensor apparatus 210 is under abnormal status, and thus, outputs a notification instructing signal to the notifying unit 250. Then, the notifying unit 250 notifies the abnormal status to the passenger by way of the alarm sound and the display on the monitor (step S50), so that the self-diagnosing process operation is accomplished.

In accordance with the sixth embodiment, in order to prevent an erroneous detection, the ultrasonic sensor apparatus 210 has been arranged as follows: That is, after the abnormal event has been judged, the drive signal producing instruction is not outputted from the ECU 220 to the drive signal producing unit 230 unless a resetting process operation is carried out. In other words, the ultrasonic sensor apparatus 210 has been arranged by that this ultrasonic sensor apparatus 210 does not function as the obstruction detecting apparatus unless a checking operation, a repairing operation, and a replacement are carried out. It should also be noted that the notification may be alternatively turned OFF in connection with the completion of the judging process operation. Alternatively, only the alarm sound may be turned OFF, and the display may remain until the resetting process operation is carried out.

As previously described, in accordance with the ultrasonic sensor apparatus 210 shown in this sixth embodiment, the reception signal of the detour wave W2 is employed which is directly propagated from the transmission-purpose tube portion 132a to the reception-purpose tube portion 132b located in close proximity of this transmission-purpose tube 132a. As a result, the ultrasonic sensor apparatus 210 (ultrasonic sensor 100) can self-diagnose whether or not the abnormal event thereof is present without being influenced by the obstruction 201. More specifically, it is possible to judge whether or not the abnormal event is present irrespective of the transmission-purpose ultrasonic sensor, or the reception-purpose ultrasonic sensor.

It should also be noted that in the above-described sixth embodiment, the notification for notifying the abnormal event is performed by way of the alarm sound and the display on the monitor. However, the notifying unit 250 is not limited only to the above-described example. Alternatively, other than the above-described case, a display apparatus mounted on an instrument panel of a vehicle may be employed.

Figure 20:
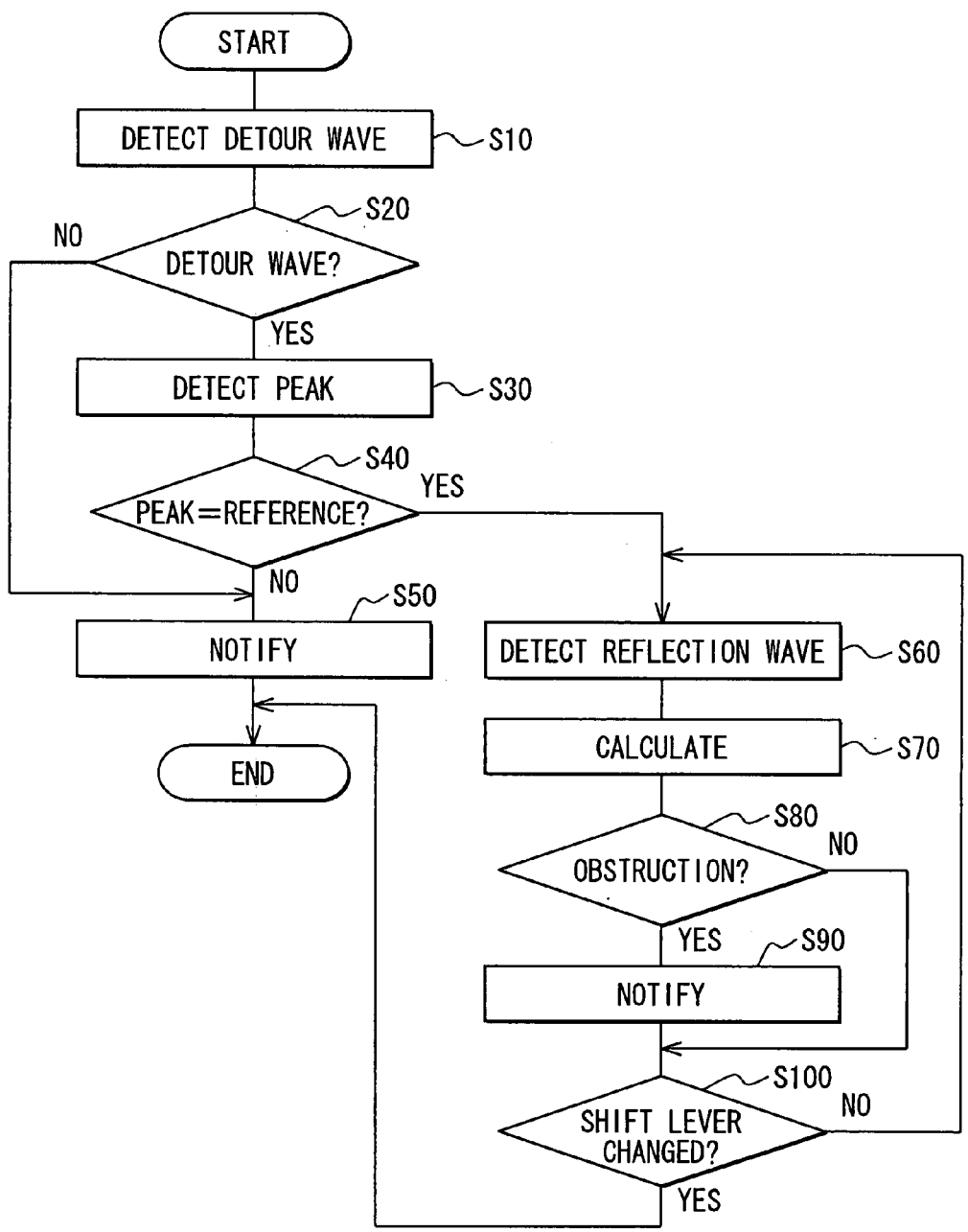
FIG. 20 is a flow chart for describing a modification of the process operations shown in FIG. 19.

Also, the above-described sixth embodiment has exemplified such an example that the judging process operation is carried out since the IG key is turned ON. However, the ultrasonic sensor apparatus 210 may be alternatively arranged in such a manner that the judging process operation is executed in response to a shift lever position. For example, in the case that the ultrasonic sensor 100 is arranged on a rear-sided bumper 10, at a time instant when the shift lever position is selected to an "R (reverse)" position, a judging process operation shown in FIG. 20 may be alternatively executed. In this alternative case, the judging process operation is executed as a pre-stage of the obstruction detecting process operation. As represented in FIG. 20, the judging process operation for judging whether or not the abnormal event is present is carried out in a similar manner to the above-explained process operations (steps S10 to S50). In a step S40, when the ECU 220 judges that a peak value is made coincident with the reference value, the detection-purpose piezoelectric vibrating element 110b detects a reflection wave (step S60). Then, the ECU 220 executes a predetermined calculating process operation based upon a reception signal of the reflection wave (step S70), and judges whether or not an obstruction is present based upon the calculation result (step S80). Only when the ECU 220 judges that the obstruction is present, the ECU 220 outputs a notification designation signal to the notifying unit 250, and then, the notifying unit 250 notifies the obstruction to the passenger by using, for instance, an alarm sound (step S90). The above-described process operations defined from the steps S60 to S90 are repeatedly carried out until the shift lever position is changed (either "D" or "P" positions). When the shift lever position is changed (step S100), the judging process operation is accomplished. FIG. 20 is a flow chart for indicating a modification of the process operation of FIG. 19. It should also be noted that although the modification of FIG. 20 indicates such an example that the reflection wave is detected in the step S60, the detection of the reflection wave may be alternatively carried out at such a step after the step S10 until the step S70.

The above-described sixth embodiment has exemplified as the simplest example such an example that the ultrasonic sensor 100 contains one piece of the transmission-purpose piezoelectric vibrating element 110a and one piece of the reception-purpose piezoelectric vibrating element 110b as the piezoelectric vibrating element 110. However, the structure of the ultrasonic sensor 100 is not limited only to the above-explained example. Alternatively, while at least 2 pieces of the piezoelectric vibrating elements 110 (two tube portions 132) are contained, at least one piezoelectric vibrating element 110 may have a transmission function, whereas at least one piezoelectric vibrating element 110 may have a reception function. For instance, the ultrasonic sensor 100 may be alternatively constructed by employing a plurality of the piezoelectric vibrating elements 110 having the transmission/reception functions.

Seventh Embodiment

Figure 21:
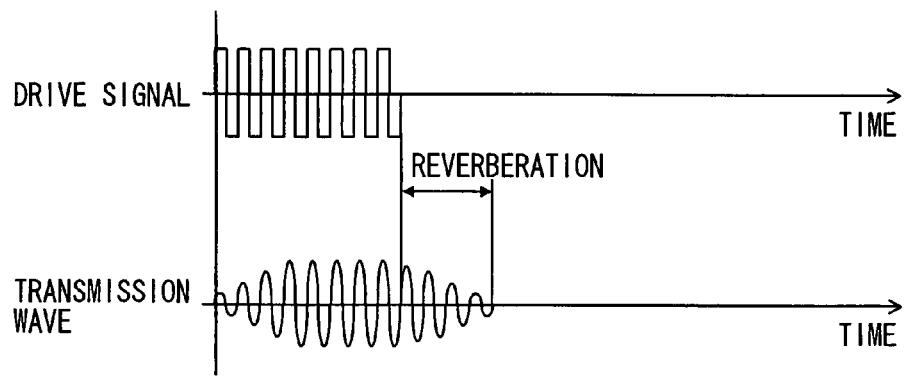
FIG. 21 is an explanatory diagram for explaining reverberation.
Figure 22A:
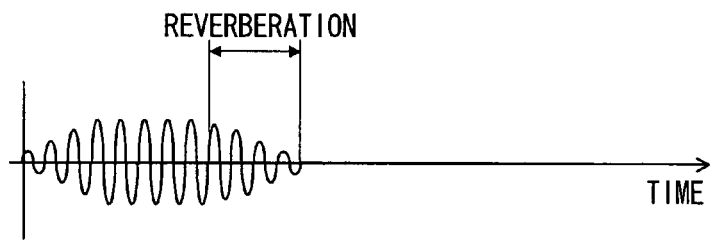
FIG. 22A and FIG. 22B are diagrams for indicating changes in transmission waves.
Figure 22B:
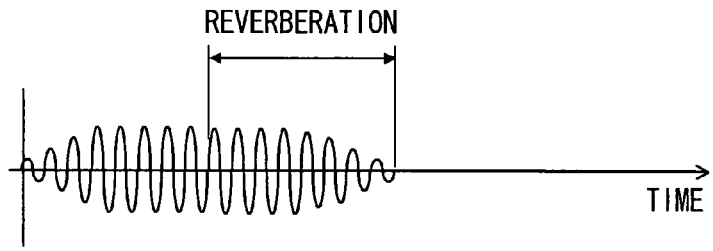
Figure 23:
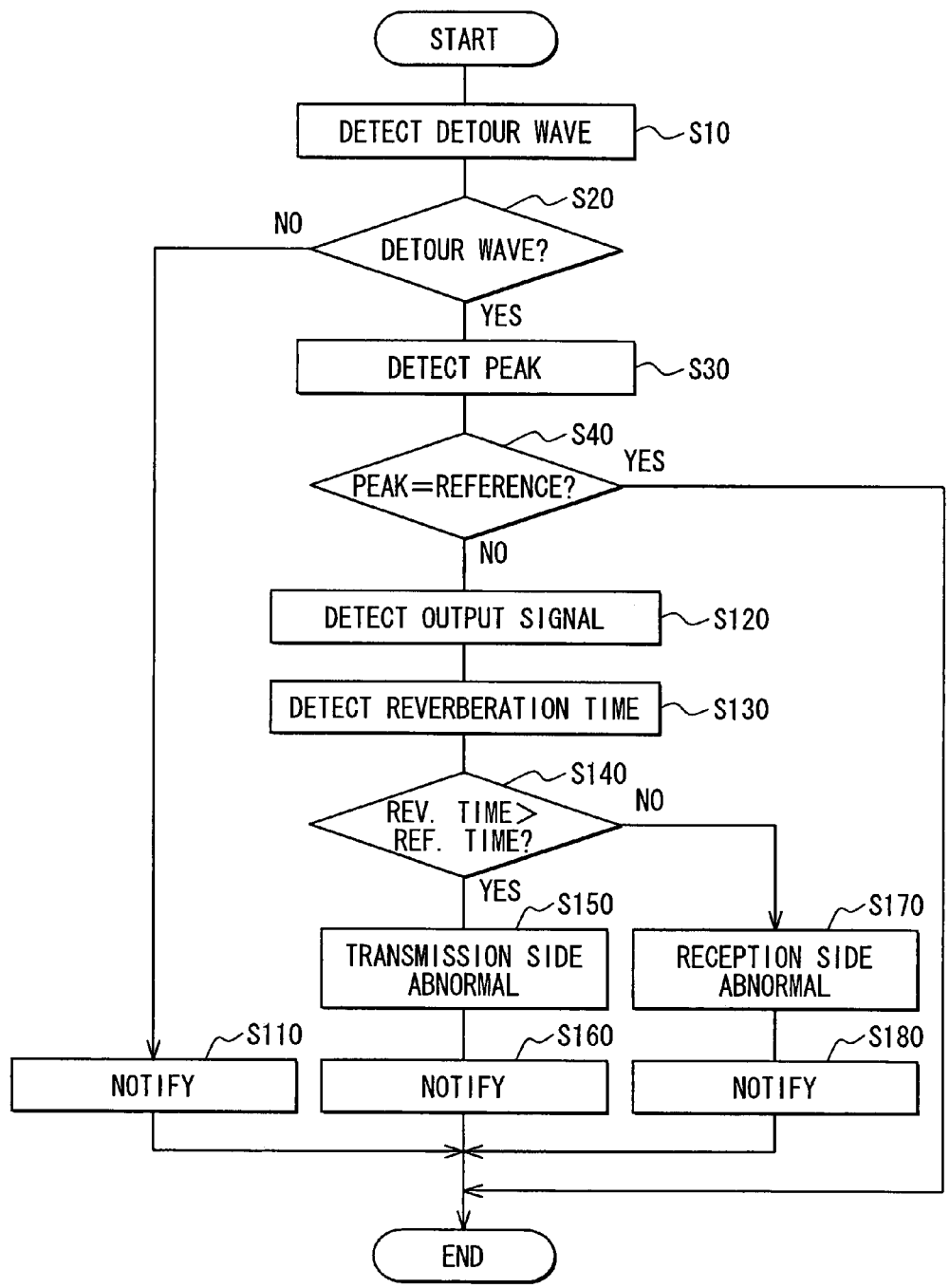
FIG. 23 is a flow chart for describing an example as to process operations for judging whether or not an abnormal event of an ultrasonic sensor apparatus is present in a seventh embodiment.

FIG. 21 is an explanatory diagram for explaining reverberation. FIG. 22A and FIG. 22B are diagrams for indicating changes in transmission waves: FIG. 22A shows such a case that an abnormal event occurs on a reception side; and FIG. 22B indicates such a case that an abnormal event occurs on a transmission side. FIG. 23 is a flow chart for describing process operations for judging whether or not an abnormal event of the ultrasonic sensor apparatus according to the seventh embodiment is present.

Since the ultrasonic sensor apparatus according to the seventh embodiment has a large number of common technical points as to the ultrasonic sensor apparatus 210 shown in the sixth embodiment, detailed descriptions of the common technical points are omitted, and different technical points will be mainly explained.

Although the above-described ultrasonic sensor apparatus 210 (ultrasonic sensor 100) of the sixth embodiment can judge whether or not the abnormal event thereof is present, this ultrasonic sensor apparatus 210 cannot judge that this abnormal event occurs in either the transmission side or the reception side. To the contrary, this seventh embodiment is featured by that the ECU 220 may judge a position under abnormal condition (namely, abnormal event is present on either transmission side or reception side) based upon an attenuated waveform (namely, reverberation of transmission wave) of an output signal (transmission wave) of the transmission-purpose piezoelectric vibrating element 110a.

First of all, a description is made of an attenuated waveform (reverberation) of an output signal (transmission wave) of the transmission-purpose piezoelectric vibrating element 110a. As represented in FIG. 21, for example, when a self-diagnostic drive signal is inputted from the drive signal producing unit 230 to the transmission-purpose piezoelectric vibrating element 110a, the piezoelectric vibrating element 110a is vibrated in the transmission mode and outputs transmission waves (ultrasonic waves) via the bottom portion 121 of the housing 120 to the exterior portion of the vehicle. Even if the self-diagnostic drive signal is stopped, namely even if the transmission/vibration of the piezoelectric vibrating element 110a are stopped, the bottom portion 121 thereof functioning as the vibrating plate is vibrated for a short time. This vibration is referred to as "reverberation." Thus, as represented in FIG. 21, the output of the transmission wave becomes longer than the self-diagnostic drive signal by a reverberation time. In the below-mentioned specification, it is so assumed that the output signal of the transmission wave indicated in FIG. 21 corresponds to such an output signal produced under such a condition that no abnormal event occurs in the transmission-sided ultrasonic sensor 100a.

Next, a basic idea for judging an abnormal position by utilizing reverberation will now be described with reference to FIG. 22A-22B. For example, in the case that an abnormal event is present in the reception-sided ultrasonic sensor 100b (namely, piezoelectric vibrating element 110b and tube portion 132b), an influence caused by the abnormal event is not given to an output signal of a transmission wave, so that the output signal of the transmission wave is represented in FIG. 22A. In other words, an attenuated waveform of the output signal of the transmission wave becomes substantially identical to that of the reference status shown in FIG. 21, and for example, a reverberation time of this output signal of the transmission wave becomes substantially equal to a reverberation time of the reference status. The reverberation time of the reference status corresponds to a second reference value.

In contrast to the above case, when an abnormal event (for example, foreign article 206 is penetrated, or tube portion 132a is broken) occurs in the tube portion 132a in the reception-sided ultrasonic sensor 100b, echoes of the ultrasonic waves reflected from the abnormal portion are received by the piezoelectric vibrating element 110a. As a consequence, an attenuated waveform of the output signal of the transmission wave is different from the attenuated waveform of the reference status shown in FIG. 21, so that a reverberation time of this attenuated waveform becomes longer than the revelation time of the reference status. The reverberation time of the reference status corresponds to the second reference value. As previously explained, the position under abnormal condition can be judged based upon the attenuated waveform of the output signal of the transmission wave.

It should also be noted that although various sorts of methods for judging a position under abnormal condition in the ultrasonic sensor apparatus 210 based upon an attenuated waveform of an output signal of a transmission wave may be conceived, one example of these judging methods will now be explained with reference to FIG. 23. For instance, this process operation is executed subsequent to the process operation for judging whether or not the abnormal event is present (refer to FIG. 19) disclosed in the sixth embodiment. The judging process operations defined from the steps S10 to S40 are similar to those of FIG. 19 described in the sixth embodiment. It should also be understood that in the step S20, in the case that the detour wave W2 is not detected, it is predictable that at least any one of the piezoelectric vibrating elements 110a and 110b is malfunction, or at least any one of the tube portions 132a and 132b is blocked. As a consequence, the ECU 220 judges that the ultrasonic sensor apparatus 210 is under abnormal status, and thus, outputs a notification instructing signal to the notifying unit 250. Then, the notifying unit 250 notifies the abnormal status to a passenger by way of an alarm sound and a display on the monitor (step S110), so that the self-diagnosing process operation is accomplished.

When the detected peak value is substantially made coincident with the reference value in the step S40, the ECU 220 judges that no abnormal event occurs in the piezoelectric vibrating element 110 (elements 110a and 110b) and also in the tube portion 132 (tube portions 132a and 132b), and thus, the self-diagnosing process operation is accomplished.

In such a case that the detected peak value is different from the reference value, in the step S40, the ECU 220 judges that the ultrasonic sensor apparatus 210 is under abnormal status, and thus, again outputs a self-diagnostic drive signal producing instruction to the oscillating circuit 231 of the drive signal producing unit 230. Upon receipt of this self-diagnostic drive signal producing instruction, the drive signal producing unit 230 outputs a self-diagnostic drive signal to the transmission-purpose piezoelectric vibrating element 110a, so that the piezoelectric vibrating element 110a is vibrated in the transmission mode so as to output transmission waves (ultrasonic waves).

At this time, the piezoelectric vibrating element 110a detects the output signal of the transmission wave (step S120), and the ECU 220 detects a reverberation time based upon the output signal of the transmission wave (step S130). Then, the ECU 220 judges whether or not the detected reverberation time is longer than the reference value (second reference value) which has been previously stored in the memory (step S140).

When the detected reverberation time is shorter than, or equal to the reference value, the ECU 220 judges that the abnormal event is not present in the transmission-sided ultrasonic sensor 100a, and the abnormal event is present in the reception-sided ultrasonic sensor 100b (step S150). Then, the ECU 220 outputs a notification instructing signal to the notifying unit 250. Then, the notifying unit 250 notifies the abnormal status to the passenger by way of the alarm sound and the display on the monitor (step S160), so that the self-diagnosing process operation is accomplished.

When the detected reverberation time is longer than the reference value, the ECU 220 judges that the abnormal event is present in the transmission-sided ultrasonic sensor 100a (tube portion 132a) (step S170). Then, the ECU 220 outputs a notification instructing signal to the notifying unit 250. Then, the notifying unit 250 notifies the abnormal status to the passenger by way of the alarm sound and the display on the monitor (step S180), so that the self-diagnosing process operation is accomplished. For example, in the notification in the steps S110, S160, and S180, the respective notification sounds and the respective displays may be changed. In the cases of the notification steps S160 and S180, since the positions under abnormal conditions have also been judged, this positional information may also be involved.

As previously described, in accordance with the ultrasonic sensor apparatus 210 of the seventh embodiment, the abnormal position of the ultrasonic sensor apparatus 210 (ultrasonic sensor 100) can be judged based upon the attenuated waveform (reverberation time) of the output signal of the transmission wave.

The seventh embodiment has exemplified such an example that when the detected peak value is different from the reference value after the comparing/judging operation of the step S40 has been accomplished, the ECU 220 again outputs the self-diagnostic drive signal producing instruction so as to vibrate the transmission-purpose piezoelectric vibrating element 110a in the transmission mode, and then the output signal of the transmission wave is detected in the step S120. Alternatively, before the detour wave W2 is detected in the step S10, the output signal of the transmission wave for producing the detour wave W2 may be detected.

Also, the judging process operation described in the seventh embodiment may not be limited only to the process operation made in combination with the judging process operation of the sixth embodiment shown in FIG. 19. For example, the judging process operation of the seventh embodiment may be alternatively combined with the judging process operation of the sixth embodiment shown in FIG. 20. Alternatively, both the judging process for judging whether or not the abnormal event of the ultrasonic sensor apparatus 210 is present, and the judging process for judging the abnormal position may be executed in combination with each other based upon the attenuated waveform of the output signal of the transmission wave without executing the judging process operation based upon the detour wave W2 shown in the sixth embodiment. In this alternative case, for example, the process operations defined from the step S110 to the step S180 shown in FIG. 23 may be alternatively executed. It should also be noted that when the output signal of the transmission wave is not detected, the ECU 220 may alternatively judge that the abnormal event occurs. It should also be understood that if such an arrangement is employed, then the ECU 220 may judge only the presence/absence of the abnormal event and the abnormal position on the side of the piezoelectric vibrating element 110 having the transmission function, but the ECU 220 may not judge the presence/absence of the abnormal event and the abnormal position on the side of the piezoelectric vibrating element 110 only having the reception function. As a consequence, in such a case that all of the piezoelectric vibrating elements 110 have the transmission functions, the ECU 220 may alternatively execute the judging operation as to the presence/absence of the abnormal event and the judging operation as to the abnormal position of the ultrasonic sensor apparatus 210 based upon the attenuated waveform of the output signal of the transmission wave.

Figure 24:
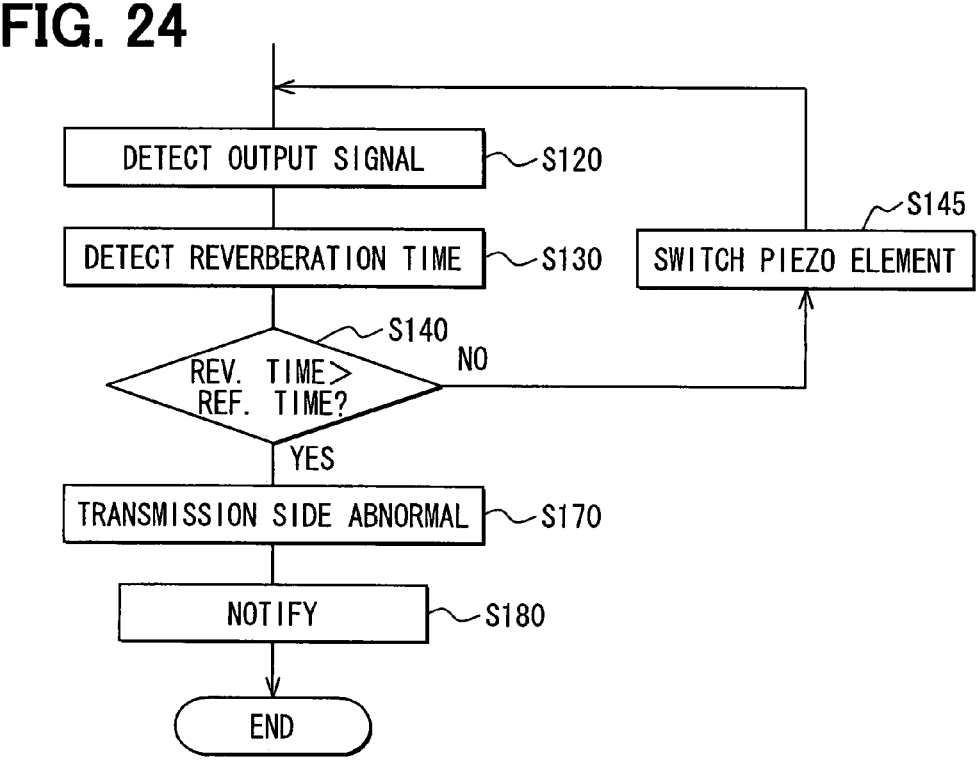
FIG. 24 is a flow chart for describing a modification as to the judging process operation of FIG. 23.

Also, the above-described seventh embodiment has exemplified as the simplest example such an example that the ultrasonic sensor 100 contains one piece of the transmission-purpose piezoelectric vibrating element 110a and one piece of the reception-purpose piezoelectric vibrating element 110b as the piezoelectric vibrating element 110. However, the structure of the ultrasonic sensor 100 is not limited only to the above-explained example. For instance, the ultrasonic sensor apparatus may be alternatively arranged with employment of a plurality of piezoelectric vibrating elements 110 (either only transmission-purpose or transmission/reception-purpose elements) having transmission functions. In this alternative case, for instance, as shown in FIG. 24, in the step S120, the ECU 220 selects one of these plural piezoelectric vibrating elements 110 having the transmission functions, and vibrates the selected one piezoelectric vibrating element in the transmission mode so as to detect an output signal of a transmission wave. Then, the ECU 220 detects a reverberation time based upon the detected output signal of the transmission wave (step S130), and judges whether or not the detected reverberation time is longer than the reference value (second reference value) which has been previously stored in the memory (step S140). As a result, when the detected reverberation time is shorter than, or equal to the reference value, the ECU 220 judges that no abnormal event is present in the tube portion 132 arranged in the selected piezoelectric vibrating element 110, and then, switches this selected piezoelectric vibrating element 110 to another piezoelectric vibrating element 110 having the transmission function so as to vibrate the switched piezoelectric vibrating element 110 in the transmission mode. The above-explained process operation defined from the steps S120 to S145 are repeatedly carried out while the piezoelectric vibrating element 110 are sequentially switched until the ECU 220 judges that a reverberation time is longer than the reference value in the step S140. As previously described, in the ultrasonic sensor apparatus equipped with the plurality of piezoelectric vibrating elements 110 having the transmission function, the ECU 220 may judge the position under abnormal status. FIG. 24 is a flow chart for explaining a modification of the seventh embodiment.

Figure 25:
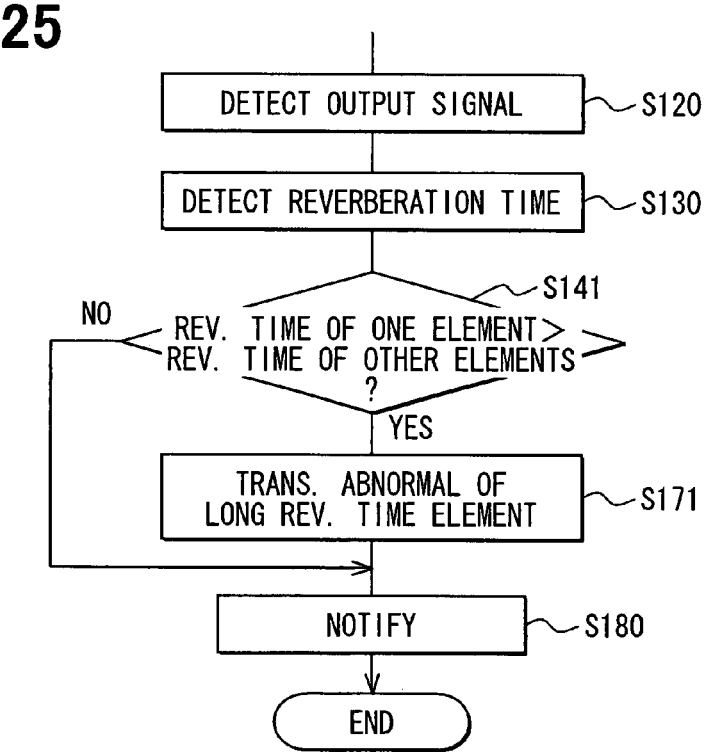
FIG. 25 is flow chart for describing a modification as to the judging process operation of FIG. 23.

It should also be noted that alternatively, in the step S120, the ECU 220 may vibrate all of the piezoelectric vibrating elements 110 having the transmission functions in the transmission mode; in the step S130, the ECU 220 may detect reverberation times of the respective transmission waves; and in the step S140, the ECU 220 may compare each of the detected reverberation times with the reference time. In this alternative case, even if the abnormal events are present in all of the tube portions 132 where all of the piezoelectric vibrating elements 110 having the transmission functions are arranged, the ECU 220 may judge that the abnormal events occur. As another example, for instance, as shown in FIG. 25, alternatively, the ECU 220 may vibrate all of the piezoelectric vibrating elements 110 having the transmission functions in the transmission mode; in the step S130, the ECU 220 may detect reverberation times of the respective transmission waves; and in the step S141, the ECU 220 may compare each of the detected reverberation times with each other. In this alternative case, if there is a reverberation time-longer than that of at least one piezoelectric vibrating element 110, then the ECU 220 may judge that an abnormal event occurs in such a tube portion 132 where the piezoelectric vibrating element 110 having the above-described longer reverberation time is arranged, and then, may issue notification containing, for example, positional information thereof in the step S180. It should also be understood that when all of reverberation times are equal to each other, it is so assumed that abnormal events are present in all of the tube portions 132, or abnormal events are present in portions other than the tube portions 132, and then, the ECU 220 may notify this fact in the step S180. As the latter-mentioned abnormal events, for example, it is conceivable that all of the piezoelectric vibrating elements 110 having the transmission functions are malfunction. In this alternative case, since the reverberation times of the output signals from the plural piezoelectric vibrating elements 110 having the transmission functions are compared with each other, influences caused in changes of measuring conditions (for example, changes in reverberation times caused by temperatures) can be cancelled. FIG. 25 is a flow chart for showing another modification of the seventh embodiment.

In the embodiments, such an exemplification has been disclosed that the ultrasonic sensor 100 has been mounted on the bumper 10 of the vehicle as the moving object. However, this moving object is not limited only to the vehicle, but also, the sensor mounting unit is not limited only to the bumper 10. Even when a vehicle is employed, the ultrasonic sensor 100 may be mounted on, for example, a body of this vehicle.

Also, the structure of the ultrasonic sensor 100 is not limited only to the structures shown in the embodiments, namely, total numbers, arrangements, shapes, and transmission/reception functions of the piezoelectric vibrating element 110 and the tube portion 132. That is, the ultrasonic sensor 100 may be equipped with at least 2 pieces of the piezoelectric vibrating elements 110 (2 pieces of tube portions 132), while at least one of these piezoelectric vibrating elements 110 may have a transmission function, and at least another piezoelectric vibrating element 110 may have a reception function. Also, in order that at least one operation of transmission and reception operations can be carried out, while the piezoelectric vibrating elements 110 may be fixed at one edge portion of each of the tube portions 132 (waveguides) one by one, each of these tube portions 132 may be alternatively arranged which are capable of detecting both reflection waves and detour waves. Alternatively, the tube portions 132 may be independently arranged as waveguides.

The above disclosure has the following aspects.

According to a first aspect of the present disclosure, an ultrasonic sensor includes: a first piezoelectric vibrator for transmitting an ultrasonic wave as a transmission wave toward an outside of a mobile body, wherein the transmission wave is reflected by an object of the outside of the mobile body so that a reflection wave is generated; a plurality of second piezoelectric vibrators for receiving the reflection wave and for outputting a reception signal corresponding to strength of the reflection wave; a casing for accommodating the first piezoelectric vibrator and the plurality of second piezoelectric vibrators, wherein the casing includes a bottom, wherein each of the first piezoelectric vibrator and the plurality of second piezoelectric vibrators contacts and is fixed to an inner surface of the bottom of the casing, and wherein an outer surface of the bottom of the casing opposite to the inner surface provides a vibrating surface; and a plurality of waveguide tubes for guiding the ultrasonic wave between the outside of the mobile body and the vibrating surface of the casing. Each waveguide tube has a first opening, which is coupled with a through hole of an outer member of the mobile body so that the waveguide tube communicates with the outside of the mobile body. Each waveguide tube corresponds to one of the first piezoelectric vibrator and the plurality of second piezoelectric vibrators. An area of the first opening of each waveguide tube is smaller than an area of the vibrating surface of the casing. A distance between two adjacent first openings of waveguide tubes is smaller than a distance between two adjacent vibrating surfaces. Each waveguide tube has a length, which is set in such a manner that a phase difference of the reflection waves at the first openings between one waveguide tube and another waveguide tube is equal to a phase difference of the reflection waves at the vibrating surfaces between the one waveguide tube and the another waveguide tube.

In the above sensor, appearance of the sensor, i.e., design of the sensor, is improved since the area of the first opening of each waveguide tube is smaller than the area of the vibrating surface of the casing. Further, since the length of each waveguide tube is appropriately determined, so that the direction of the object is detectable. Further, since the distance between two adjacent first openings of waveguide tubes is smaller than the distance between two adjacent vibrating surfaces, detection area of the object is improved. Furthermore, since the first ends of the waveguide tubes provide a transmission and reception surface of the ultrasonic wave, the sensor can detect the object without reducing impact strength.

Alternatively, each waveguide tube may have a second opening facing the vibrating surface, the second opening being opposite to the first opening, and an area of second opening of at least one waveguide tube may be smaller than an area of first opening of the one waveguide tube.

Alternatively, each waveguide tube may have a second opening facing the vibrating surface, the second opening being opposite to the first opening, and an area of second opening of at least one waveguide tube may be larger than an area of first opening of the one waveguide tube.

Alternatively, each waveguide tube may have a second opening facing the vibrating surface, the second opening being opposite to the first opening, and at least one waveguide tube may have a cross section and a cross sectional area, which are constant between the first opening and the second opening, respectively.

Alternatively, at least one second piezoelectric vibrator may be capable of transmitting the ultrasonic wave as the transmission wave toward the outside of the mobile body.

Alternatively, the lengths of all waveguide tubes may be same.

Alternatively, the first opening of each waveguide tube may be disposed on a same plane of an outer surface of the outer member of the mobile body.

Alternatively, the distance between two adjacent first openings of waveguide tubes may be equal to or smaller than a half of a wavelength of the ultrasonic wave.

Alternatively, the first openings of the plurality of waveguide tubes may have a same opening area and a same two-dimensional shape.

Alternatively, the first openings of the plurality of waveguide tubes may have different two-dimensional shapes, respectively.

Alternatively, each first opening of the plurality of waveguide tubes may have a two-dimensional shape, which has two different dimensions. One dimension is defined along with one axis, and the other dimension is defined along with another axis, which is perpendicular to the one axis.

Alternatively, the sensor may further includes: another first piezoelectric vibrator for transmitting the ultrasonic wave as a transmission wave toward the outside of the mobile body. The first piezoelectric vibrator and the another first piezoelectric vibrator transmit the ultrasonic waves simultaneously.

Alternatively, the first opening of each waveguide tube may have a first bottom end along with a gravitational force direction, and the second opening of the waveguide tube may have a second bottom end along with the gravitational force direction. The first bottom end is disposed under the second bottom end in the gravitational force direction.

Alternatively, each waveguide tube may include an acoustic matching member, which fills an inside of the waveguide tube, and the acoustic matching member has an acoustic impedance, which is in a range between an acoustic impedance of atmosphere around the mobile body and an acoustic impedance of the bottom of the casing.

Alternatively, the waveguide tubes may be separated from each other. Further, the sensor may further include: a vibration reduction member disposed between two adjacent waveguide tubes. The vibration reduction member has an acoustic impedance, which is different from an acoustic impedance of the waveguide tube so that the vibration reduction member reduces unwanted vibration.

Alternatively, the mobile body may be a vehicle, and the outer member of the mobile body is a bumper or a body of the vehicle. Further, the length of one waveguide tube may be defined as L, the ultrasonic wave may have a wavelength defined as λ, the length of another waveguide tube may be defined as L+nλ, and n represents an integer.

According to a second aspect of the present disclosure, an obstacle detection device including the ultrasonic sensor defined in the first aspect of the present disclosure. The obstacle detection device detects a direction of the object as an obstacle based on a phase difference of reception signals between two of the plurality of second piezoelectric vibrators. This device can detect the obstacle with wide range.

According to a third aspect of the present disclosure, an ultrasonic sensor includes: a plurality of waveguide tubes having a first end and a second end; at least one transmission ultrasonic element for transmitting an ultrasonic wave as a transmission wave through one of the plurality of waveguide tubes, wherein the one transmission ultrasonic element is disposed on the first end of the one of the plurality of waveguide tubes; at least one reception ultrasonic element for receiving the ultrasonic wave and for outputting a reception signal corresponding to strength of the ultrasonic wave, wherein the one reception ultrasonic element is disposed on the first end of another one of the plurality of waveguide tubes; and a determination element for determining malfunction of the one transmission ultrasonic element, the one reception ultrasonic element, the one of the plurality of waveguide tubes, or the another one of the plurality of waveguide tubes. The determination element determines the malfunction on the basis of the reception signal of the ultrasonic wave, which is transmitted from the second end of the one of the plurality of waveguide tubes, and directly introduced into the second end of the another one of the plurality of waveguide tubes.

The above sensor can diagnose the malfunction of the sensor based on the reception signal of a detour wave.

Alternatively, the sensor may further include: a memory. The ultrasonic wave directly introduced into the another one of the plurality of waveguide tubes from the one of the plurality of waveguide tubes is defined as a detour wave. The memory memorizes a peak value of the reception signal of the detour wave as a first reference value when the another one of the plurality of waveguide tubes functions normally, and the determination element determines the malfunction when the one reception ultrasonic element does not receive the detour wave or when a peak value of the reception signal is different from the first reference value.

Alternatively, the determination element may further determine a place, at which the malfunction occurs, on the basis of an attenuation waveform of the transmission wave. Further, the memory may memorize a reverberation time of the transmission wave as a second reference value when the one of the plurality of waveguide tubes functions normally, and the determination element determines the malfunction of the one of the plurality of waveguide tubes when the peak value of the reception signal is different from the first reference value and when a reverberation time of the transmission wave is longer than the second reference value. Furthermore, the determination element may determine the malfunction of the another one of the plurality of waveguide tubes when the peak value of the reception signal is different from the first reference value and when the reverberation time of the transmission wave is equal to or smaller than the second reference value. Further, the transmission wave may be reflected by an object of an outside of a mobile body so that a reflection wave is generated, and the reception ultrasonic element receives the reflection wave and outputs the reception signal corresponding to strength of the reflection wave.

Alternatively, the sensor may further include: one or more transmission ultrasonic element for providing a plurality of transmission ultrasonic elements. The determination element compares reverberation times of the transmission waves transmitted from the plurality of transmission ultrasonic elements when the peak value of the reception signal is different from the first reference value, and when at least one reverberation time is longer than other reverberation times, the determination element determines that a waveguide tube corresponding to a long reverberation time malfunctions.

Alternatively, the sensor may further include: a notification element for notifying the malfunction based on a determination result of the determination element.

Alternatively, the second end of each waveguide tube may be coupled with a through hole of an outer member of a mobile body so that the waveguide tube communicates with an outside of the mobile body, and the ultrasonic sensor is disposed in the mobile body.

According to a fourth aspect of the present disclosure, an ultrasonic sensor includes: a waveguide tube having a first end and a second end; at least one transmission ultrasonic element for transmitting an ultrasonic wave through the waveguide tube, wherein the transmission ultrasonic element is disposed on the first end of the waveguide tube; at least one reception ultrasonic element for receiving the ultrasonic wave and for outputting a reception signal corresponding to strength of the ultrasonic wave, wherein the one reception ultrasonic element is disposed on the first end of the waveguide tube; and a determination element for determining malfunction of the waveguide tube on the basis of an attenuation waveform of the transmission wave from the transmission ultrasonic element. The above sensor can diagnose the malfunction of the sensor based on the attenuation waveform of the transmission wave.

According to a fifth aspect of the present disclosure, an ultrasonic sensor for detecting an object of an outside of a vehicle includes: a transmission piezoelectric vibrator for transmitting an ultrasonic wave as a transmission wave toward the outside of a vehicle, wherein the transmission wave is reflected by the object of the outside of the vehicle so that a reflection wave is generated; a reception piezoelectric vibrator for receiving the reflection wave and for outputting a reception signal corresponding to strength of the reflection wave; a plurality of casings for accommodating one of the transmission piezoelectric vibrator and the reception piezoelectric vibrator, wherein each casing includes a bottom, wherein each of the transmission piezoelectric vibrator and the reception piezoelectric vibrator contacts an inner surface of the bottom of the casing, and wherein an outer surface of the bottom of each casing opposite to the inner surface provides a vibrating surface; and a plurality of waveguide tubes for guiding the ultrasonic wave between the outside of the mobile body and the vibrating surface of the casing. Each waveguide tube has a first opening, which is coupled with a through hole of an outer member of the mobile body so that the waveguide tube communicates with the outside of the mobile body. Each waveguide tube corresponds to one of the transmission piezoelectric vibrator and the reception piezoelectric vibrator. An area of the first opening of each waveguide tube is smaller than an area of the vibrating surface of the casing. A distance between two first openings of adjacent two waveguide tubes is smaller than a distance between two vibrating surfaces of the adjacent two waveguide tubes. The length of one waveguide tube is defined as L. The ultrasonic wave has a wavelength defined as λ. The length of another waveguide tube is defined as L+nλ, and n represents an integer. In the above sensor, appearance of the sensor, i.e., design of the sensor, is improved since the area of the first opening of each waveguide tube is smaller than the area of the vibrating surface of the casing. Further, since the length of each waveguide tube is appropriately determined, so that the direction of the object is detectable. Further, since the distance between two adjacent first openings of waveguide tubes is smaller than the distance between two adjacent vibrating surfaces, detection area of the object is improved. Furthermore, since the first ends of the waveguide tubes provide a transmission and reception surface of the ultrasonic wave, the sensor can detect the object without reducing impact strength.

Alternatively, the sensor may further include: a determination element for determining malfunction of the transmission piezoelectric vibrator, the reception piezoelectric vibrator, and the plurality of waveguide tubes. The determination element determines the malfunction on the basis of the reception signal of the reception wave, which is transmitted from the transmission piezoelectric vibrator, and directly introduced into the reception piezoelectric vibrator. The above sensor can diagnose the malfunction of the sensor based on the reception signal of a detour wave.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An ultrasonic sensor comprising:
   a first piezoelectric vibrator for transmitting an ultrasonic wave as a transmission wave toward an outside of a mobile body, wherein the transmission wave is reflected by an object of the outside of the mobile body so that a reflection wave is generated;
   a plurality of second piezoelectric vibrators for receiving the reflection wave and for outputting a reception signal corresponding to strength of the reflection wave;
   a casing for accommodating the first piezoelectric vibrator and the plurality of second piezoelectric vibrators, wherein the casing includes a bottom, wherein each of the first piezoelectric vibrator and the plurality of second piezoelectric vibrators contacts and is fixed to an inner surface of the bottom of the casing, and wherein an outer surface of the bottom of the casing opposite to the inner surface provides a vibrating surface; and
   a plurality of waveguide tubes for guiding the ultrasonic wave between the outside of the mobile body and the vibrating surface of the casing, wherein
   each waveguide tube has a first opening, which is coupled with a through hole of an outer member of the mobile body so that the waveguide tube communicates with the outside of the mobile body,
   each waveguide tube corresponds to one of the first piezoelectric vibrator and the plurality of second piezoelectric vibrators,
   an area of the first opening of each waveguide tube is smaller than an area of the vibrating surface of the casing,
   a distance between two adjacent first openings of waveguide tubes is smaller than a distance between two adjacent vibrating surfaces, and
   each waveguide tube has a length, which is set in such a manner that a phase difference of the reflection waves at the first openings between one waveguide tube and another waveguide tube is equal to a phase difference of the reflection waves at the vibrating surfaces between the one waveguide tube and the another waveguide tube.

2. The sensor according to claim 1, wherein
   each waveguide tube has a second opening facing the vibrating surface, the second opening being opposite to the first opening, and
   an area of second opening of at least one waveguide tube is smaller than an area of first opening of the one waveguide tube.

3. The sensor according to claim 1, wherein
   each waveguide tube has a second opening facing the vibrating surface, the second opening being opposite to the first opening, and
   an area of second opening of at least one waveguide tube is larger than an area of first opening of the one waveguide tube.

4. The sensor according to claim 1, wherein
   each waveguide tube has a second opening facing the vibrating surface, the second opening being opposite to the first opening, and
   at least one waveguide tube has a cross section and a cross sectional area, which are constant between the first opening and the second opening, respectively.

5. The sensor according to claim 1, wherein
   at least one second piezoelectric vibrator is capable of transmitting the ultrasonic wave as the transmission wave toward the outside of the mobile body.

6. The sensor according to claim 1, wherein
   the lengths of all waveguide tubes are same.

7. The sensor according to claim 1, wherein
   the first opening of each waveguide tube is disposed on a same plane of an outer surface of the outer member of the mobile body.

8. The sensor according to claim 1, wherein
   the distance between two adjacent first openings of waveguide tubes is equal to or smaller than a half of a wavelength of the ultrasonic wave.

9. The sensor according to claim 1, wherein
   the first openings of the plurality of waveguide tubes have a same opening area and a same two-dimensional shape.

10. The sensor according to claim 1, wherein
    the first openings of the plurality of waveguide tubes have different two-dimensional shapes, respectively.

11. The sensor according to claim 1, wherein
    each first opening of the plurality of waveguide tubes has a two-dimensional shape, which has two different dimensions,
    one dimension is defined along with one axis, and
    the other dimension is defined along with another axis, which is perpendicular to the one axis.

12. The sensor according to claim 1, further comprising:
    another first piezoelectric vibrator for transmitting the ultrasonic wave as a transmission wave toward the outside of the mobile body,
    the first piezoelectric vibrator and the another first piezoelectric vibrator transmit the ultrasonic waves simultaneously.

13. The sensor according to claim 1, wherein
    the first opening of each waveguide tube has a first bottom end along with a gravitational force direction, the second opening of the waveguide tube has a second bottom end along with the gravitational force direction, and the first bottom end is disposed under the second bottom end in the gravitational force direction.

14. The sensor according to claim 1, wherein each waveguide tube includes an acoustic matching member, which fills an inside of the waveguide tube, and the acoustic matching member has an acoustic impedance, which is in a range between an acoustic impedance of atmosphere around the mobile body and an acoustic impedance of the bottom of the casing.

15. The sensor according to claim 1, wherein the waveguide tubes are separated from each other.

16. The sensor according to claim 15, further comprising:

a vibration reduction member disposed between two adjacent waveguide tubes, wherein the vibration reduction member has an acoustic impedance, which is different from an acoustic impedance of the waveguide tube so that the vibration reduction member reduces unwanted vibration.

17. The sensor according to claim 1, wherein the mobile body is a vehicle, and the outer member of the mobile body is a bumper or a body of the vehicle.

18. The sensor according to claim 17, wherein the length of one waveguide tube is defined as L, the ultrasonic wave has a wavelength defined as $\lambda$, the length of another waveguide tube is defined as $L+n\lambda$, and n represents an integer.

19. An obstacle detection device including the ultrasonic sensor according to claim 1, wherein the obstacle detection device detects a direction of the object as an obstacle based on a phase difference of reception signals between two of the plurality of second piezoelectric vibrators.

20. An ultrasonic sensor for detecting an object of an outside of a vehicle, the sensor comprising:

a transmission piezoelectric vibrator for transmitting an ultrasonic wave as a transmission wave toward the outside of a vehicle, wherein the transmission wave is reflected by the object of the outside of the vehicle so that a reflection wave is generated;

a reception piezoelectric vibrator for receiving the reflection wave and for outputting a reception signal corresponding to strength of the reflection wave;

a plurality of casings for accommodating one of the transmission piezoelectric vibrator and the reception piezoelectric vibrator, wherein each casing includes a bottom, wherein each of the transmission piezoelectric vibrator and the reception piezoelectric vibrator contacts an inner surface of the bottom of the casing, and wherein an outer surface of the bottom of each casing opposite to the inner surface provides a vibrating surface; and a plurality of waveguide tubes for guiding the ultrasonic wave between the outside of the mobile body and the vibrating surface of the casing, wherein each waveguide tube has a first opening, which is coupled with a through hole of an outer member of the mobile body so that the waveguide tube communicates with the outside of the mobile body, each waveguide tube corresponds to one of the transmission piezoelectric vibrator and the reception piezoelectric vibrator, an area of the first opening of each waveguide tube is smaller than an area of the vibrating surface of the casing, a distance between two first openings of adjacent two waveguide tubes is smaller than a distance between two vibrating surfaces of the adjacent two waveguide tubes, the length of one waveguide tube is defined as L, the ultrasonic wave has a wavelength defined as $\lambda$, the length of another waveguide tube is defined as $L+n\lambda$, and n represents an integer.

21. The sensor according to claim 20, further comprising:

a determination element for determining malfunction of the transmission piezoelectric vibrator, the reception piezoelectric vibrator, and the plurality of waveguide tubes, wherein the determination element determines the malfunction on the basis of the reception signal of the reception wave, which is transmitted from the transmission piezoelectric vibrator, and directly introduced into the reception piezoelectric vibrator.

* * * * *